United States Patent [19]

SooHoo

[11] Patent Number: 5,762,351
[45] Date of Patent: Jun. 9, 1998

[54] MULTI-TRACK VEHICLE WITH LOCK AND DRIVE LEAN CONTROL SYSTEM

[76] Inventor: Wayne J. SooHoo, 209 Lincoln Pkwy., Crystal Lake, Ill. 60014

[21] Appl. No.: 494,913

[22] Filed: Jun. 26, 1995

[51] Int. Cl.⁶ ..................................... B62D 9/02
[52] U.S. Cl. .................. 280/267; 180/210; 280/282; 280/772
[58] Field of Search ............ 180/210; 280/264, 280/267, 268, 269, 282, 283, 772

[56] References Cited

U.S. PATENT DOCUMENTS

| | | | |
|---|---|---|---|
| 2,260,102 | 10/1941 | Freret | 280/772 |
| 2,641,480 | 6/1953 | Bancroft | 280/772 |
| 4,020,914 | 5/1977 | Trautwein | 180/210 |
| 4,076,270 | 2/1978 | Winchell . | |
| 4,351,410 | 9/1982 | Townsend . | |
| 4,375,293 | 3/1983 | Solbes . | |
| 4,541,501 | 9/1985 | Kawasaki . | |
| 4,546,997 | 10/1985 | Smyers | 180/210 |
| 4,624,469 | 11/1986 | Bourne, Jr. . | |
| 4,634,137 | 1/1987 | Cocksedge | 280/269 |
| 4,650,213 | 3/1987 | Fujita et al. . | |
| 4,660,853 | 4/1987 | Jephcott . | |
| 4,717,164 | 1/1988 | Levavi . | |
| 4,740,004 | 4/1988 | McMullen . | |
| 4,903,857 | 2/1990 | Klopfenstein . | |
| 4,921,263 | 5/1990 | Patin . | |
| 4,998,596 | 3/1991 | Miksitz . | |
| 5,232,235 | 8/1993 | Brooks . | |
| 5,263,732 | 11/1993 | Harmeyer . | |
| 5,330,214 | 7/1994 | Brooks et al. . | |

FOREIGN PATENT DOCUMENTS

| | | | |
|---|---|---|---|
| 401229787 | 9/1989 | Japan | 180/210 |

*Primary Examiner*—Anne Marie Boehler

[57] ABSTRACT

A multi-track vehicle having a lean drive and locking system which is primarily activated when the direction of the vehicle is changed by steering so as to provide increased stability, rideability and efficiency of operation. The leanable multi-track vehicle has a main chassis for carrying an operator which is supported on at least three wheels which are spaced from each other, at least a pair of the wheels are located transversely to each other with respect to said main chassis. A subframe supports the pair of wheels from the main chassis such that the main chassis may lean with respect to the said subframe and the pair of wheels. A drive system is provided for leaning the main chassis with respect to the subframe, and a locking device is provided which locks the position of the main chassis with respect to the frame or prevents the main chassis from leaning in one direction or the other with respect to the subframe.

14 Claims, 17 Drawing Sheets

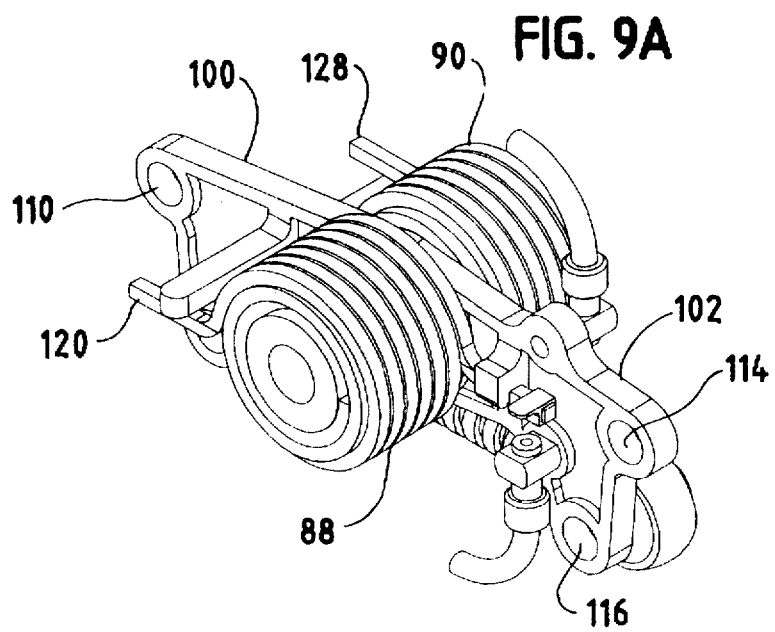
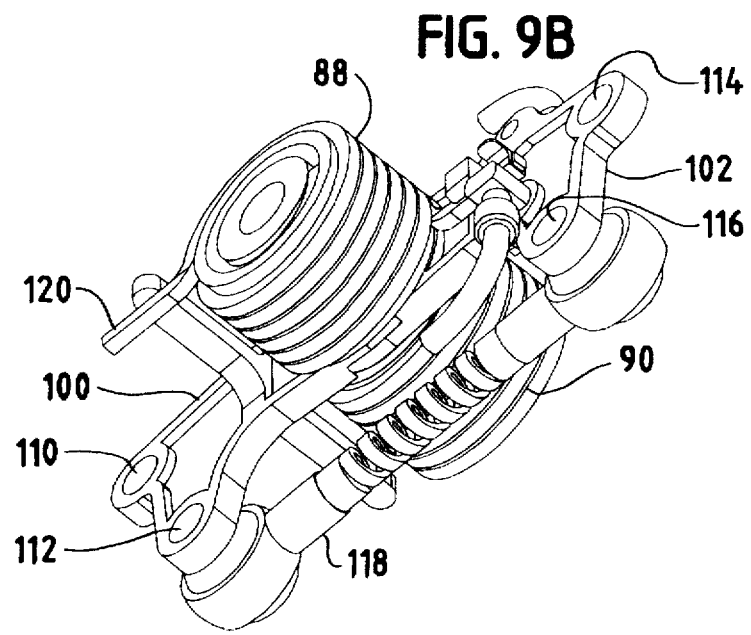

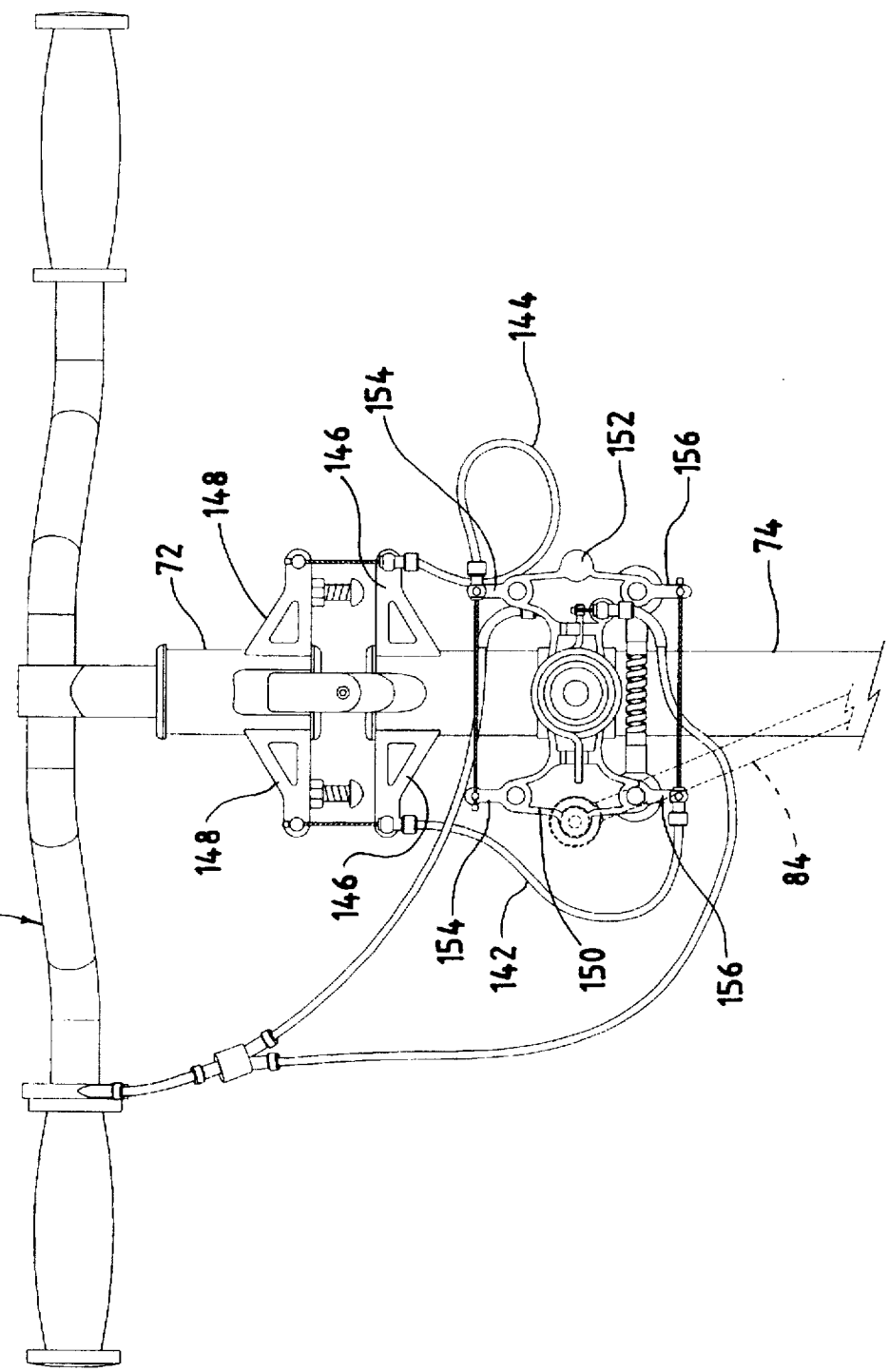

MULTI-TRACK VEHICLE WITH LOCK AND DRIVE LEAN CONTROL SYSTEM

BACKGROUND OF THE INVENTION

I. Field of the Invention

This invention relates to providing a multi-tracked vehicle with the best dynamic characteristics of both a single-track leaning, balancing vehicle and a multi-track fixed geometry load transfer vehicle. More particularly it relates to a lean drive and lock or partial or half lock system for a multi-track vehicle, which is primarily activated at slow speeds or when stopping, or when the direction of the vehicle is changed by steering, so as to greatly improve the stability, rideability, efficiency, and size of the vehicle. The lean drive and lock system in accordance with this invention is particularly applicable to light personal transport tricycle type vehicle but is also applicable to both human and engine powered vehicles having a diamond or quadracycle type wheel layout, or platform or foot print.

More particularly it relates to providing mechanisms for controlling the leanability of a multi-track vehicle which are particularly adapted to the particular type of vehicle and the conditions under which the vehicle is being operated. Operating conditions which the mechanism takes into account are all forces which contribute to the roll attitude of the vehicle, speed, cornering forces, wind, direction of travel, change in direction of travel, drivers sense of balance, and topography and condition of the surface being traversed.

II. Description of Related Art Including Information Disclosed Under 37 C.F.R. Secs. 1.97 and 1.98

U.S. Pat. No. 4,076,270—Winchell, sets forth a Foldable Cambering Vehicle which in one embodiment permits the trailing pair of wheels of a tricycle type vehicle to pivot in response to a shift in the operators weight to provide cambering during a turn. A engine powered version of the vehicle of the Winchell patent is know as the General Motors "Lean Machine" and has been exhibited at General Motors World of Motion in the Epcot Center in Florida.

U.S. Pat. No. 4,351,410—Townsend, discloses a Self-Balancing Wheeled Vehicle having a pair of spaced wheels mounted on a hinged parallelogram frame and a spaced trailing single wheel. Sensing means detects leaning of the vehicle to actuate hydraulic cylinders connected between the vehicle frame and the parallelogram frame to keep the vehicle in balance.

U.S. Pat. No. 4,624,469—Bourne, shows a Three-Wheeled Vehicle with Controlled Wheel and Body Lean, wherein the operator is able to affect and control simultaneous wheel and body lean.

U.S. Pat. No. 4,740,004—McMullen, similarly describes a three wheel cycle which permits the operator to affect and control simultaneous wheel and body lean. Further, the McMullen Patent is the only one which shows the use of a lock to hold the wheels at a desired degree of lean. However, the lock in McMullen is only used for parking and is not implemented dynamically while the vehicle is moving.

U.S. Pat. No. 4,650,213—Fujita et al reveals a system similar to that of the Bourne patent, wherein the operator is able to affect and control simultaneous wheel and body lean in a four wheel vehicle.

U.S. Pat. No. 4,660,853—Jephcott reveals a hydraulic tilting system for a tricycle type vehicle which receives control inputs from both a gravity-sensitive device and a device responsive to steering movement.

U.S. Pat. No. 4,717,164—Levavi shows a human powered road vehicle having two chassis sections, one of which sections is rotatable with respect to a fixed section. Steering and banking mechanisms rotate the rotatable section with respect to the fixed section in response to a steering input.

U.S. Pat. No. 4,903,857—Klopfenstein sets forth a three wheel vehicle in which the frame and a trailing single wheel are caused to lean into a turn with respect to the spaced front wheels in response to rotation of a steering shaft caused by the operator moving a handlebar.

U.S. Pat. No. 4,921,263—Patin also sets forth a vehicle having three or more wheels which provides for simultaneous leaning of both the wheels and the body. The height of the center of gravity of the vehicle is adjusted in accordance with the amount of leaning.

Still another example of a self-propelled balancing three-wheeled vehicle in which both the wheels and the body simultaneously tilt is U.S. Pat. No. 4,998,596.

SUMMARY OF THE INVENTION

Single track vehicles such as bicycles or motorcycles lean into a turn to counter centrifugal forces, while multi-track vehicles corner flat or roll slightly out of the turn with significant load transfers to the outside wheels. Leaning a multi-track vehicle provides many performance and design advantages including:

1. Greater stability while turning.
2. Reduced load transfer to the outside wheels when turning, which is particularly advantageous in one wheel drive vehicles.
3. Greater comfort for vehicle occupant(s) when turning.
4. Reduced likelihood of vehicle rollover when turning.
5. Reduced torsional chassis or frame stress permits reduced vehicle weight.
6. Increased vehicle stability permits greater vehicle height thereby increasing visibility and easier vehicle entry and exit for driver.
7. Due to increased stability, track width may be reduced, thereby requiring less space on the road and while parked.
8. When traveling on highly pitched surfaces the vehicle lean can be adjusted for balance and comfort unlike multi-track vehicle designs.
9. In rough terrain the vehicle balances like a bicycle since the suspension conforms to the terrain thereby easing handling and increasing driver comfort.
10. As compared to similar single track vehicle, low speed control is significantly improved. There is greater stability in windy conditions, there is no need to dismount at stops, making start/stop operations much easier, and better braking and load bearing capacity is provided due to the extra wheel or wheels. Further, the variable geometry provides a suspension which acts like a natural shock absorber to reduce frame and driver stress when traveling over rough terrain.
11. Greater vehicle frame strength is realized due to the structurally stronger support structure for the extra wheels when compared to single-track vehicles.
12. Greater ability to negotiate bumps and adverse wet surfaces due to extra wheel, the relative wheel locations and the availability of additional tire surface what will develop additional surface grip in high loading situations. Further, there is lower individual wheel load due to the distribution of a part of the total load to the additional wheel, as compared to a single track vehicle.
13. Greater balance control due to the structures ability to fix lean attitude dynamically while vehicle is in motion.

14. There is less road shock since the vehicle frame is only constrained in the pitch axis.
15. In vehicles where the wheels lean so as to remain perpendicular to the surface on which they are resting, the wheels may be made lighter since essentially only radial forces are applied to the wheels.
16. Round profile tires which have a lower rolling resistance and therefor higher energy efficiency can be used.
17. Finally, a human powered vehicle may be fully enclosed since the operator's feet need not be used to balance the vehicle when stopping.

However, there are also some problems and limitations presented by human powered leaning multi-tracked vehicles such as:

1. If the vehicle is brought to a panic stop in a high speed turn, with the vehicle leaning into the turn, it may tip over, or at least be difficult to raise to the vertical position.
2. If the vehicle is cornering heavily and the load on the wheels is biased to either side, the driver must supply the power to lean the vehicle or to change direction or velocity. In certain situations the force required of the driver may be excessive.
3. Lean control places an additional demand for attention and skill of execution on the operator, as compared to the operation of a single tracked vehicle where roll control is instantaneous and unrestricted, and no torsional stresses can be built up in the frame.

In a leaning, locking multi-tracked vehicle roll loads can be built up in the frame and used to advantage depending on the skill of the operator. In some situations the ability of the operator to roll at will is challenged. The conditions controlling roll in an un-powered assisted lean locking multi-tracked vehicle are similar but in some ways different from those of a single tracked vehicle. The relationship between lean steering and velocity does not have to be as tight as in a single tracked vehicle and can be controlled to the operators advantage. A multi-tracked vehicle that can lean as far as a single tracked vehicle and which is driven with skill, with the loads to the tracked wheels remaining constant, will have an extraordinary safety margin over a single track vehicle in roll.

Most prior approaches to constructing a leanable multi-track vehicle have coupled control of the lean to steering, to steering and speed, to centripetal force, or have provided a spring return or a combination of the above. However, spring return cannot easily compensate for payload or terrain inclination. Directly tying or coupling lean to steer causes more violent cornering than that of a fixed geometry multi-track vehicle. None of these prior approaches permits the vehicle to act primarily as a balancing and leaning single track vehicle. Rather, they create many lean control problems, require excess control hardware and present human factor drive-ability problems.

A basic problem with the leaning multi-track vehicle schemes considered prior to this invention is that they terrain follow in the roll axis at high speed, thereby to some degree over-controlling lean and balance.

In accordance with this invention it is possible to design a leaning vehicle with a lean control system, which vehicle is capable of highway speeds and is both virtually tip over proof and up-rightable from maximum lean at standstill.

It is therefore an object of this invention to provide a human or engine powered multi-track vehicle with controlled leanability. It is another object of the invention to provide a lean control system which is simple and therefor reliable. It is a further object of this invention to provide a leanable human powered multi-track vehicle which requires or needs no external fuel source or such additional machinery as motors, pumps etc., to control lean, and is therefor inherently lighter, but which is compared in performance to a powered system, and in which feedback to the operator is easily tunable.

In accordance with this invention, a multi-track vehicle is provided which is readily manufactured using a wide variety of materials and construction methods particularly when applied to a human powered vehicle or light powered personal transport vehicles, and more particularly to vehicles with a tricycle, diamond or quadracycle wheel configuration. While tricycles have a well known cornering deficit in terms of stability when compared to the four wheel automotive configuration of a similar ground engaging dimensions and center of gravity location, tricycles designed in accordance with this invention can surpass the cornering capability of the four wheel automotive configuration.

Further, a human or engine powered tricycle type vehicle in accordance with this invention has an enhance range of utility, pleasure, and performance and is a viable commuter and sport vehicle. Dynamic balance in a single-track vehicle whether in steady state operation, transition cornering or straight line operation is independent of terrain inclination. The approach of this invention is to provide the inherent design advantages and requirements of a single track balancing vehicle in a multi-track fixed geometry vehicle. In accordance with this invention a multi-track vehicle is provided with a leanable substructure. In one embodiment of the invention the substructure is a parallelogram supporting two steerable wheels in front with one driven wheel in the back, in a tricycle configuration. However, another parallelogram structure could be provided in the back to support two driven wheels, thereby providing a quadracycle type vehicle. In either case, the vehicle chassis is unconstrained with respect to the parallelogram supported wheels in roll or lean. At high speeds the vehicle is the dynamic equivalent of a single-track vehicle. The paired wheels attached to the parallelogram appear and act as a single wheel with respect to the chassis. While the wheels follow the terrain, they mainly transmit only pitch changes to the operator. Balance, that is roll and lean, is not disturbed by side by side or front to back changes in the surface being traversed. A roll/yaw coupling controls balance in a single-track vehicle. At high speeds a single-track vehicle's lean and balance is easily controlled by steering, weight shift, and speed control. At high speed a multi-track vehicle virtually operates as a single-track vehicle.

Lean control of a single-track vehicle becomes a problem at low speeds. All single-track vehicles must be propped up at a stop otherwise they will tip over. The present invention introduces two mechanisms, a locking system and a drive system which can be used individually or in combination to control the lean attitude of the vehicle. In accordance with this invention it is a subtle but important distinction with respect to the prior art to separate lean locking and lean drive to control lean as individual components so that they can be applied in different emphasis in different applications. In traditional power drives, as in automotive power steering, locking is inherent in the drive system. Locking is only disabled when drive is applied in a desired direction. Further, locking cannot disable drive input. However, when these functions are separated in accordance with this invention, locking may disable drive input. In certain applications, such as in a leanable human powered vehicle, locking alone can be sufficient to control, inhibit or correct, imbalanced situations. For instance if balance is lost, a lock can be activated to stop the roll movement if there is sufficient vehicle speed, steering weight shift and velocity. At low speeds a vehicle in accordance with this invention may be operated as a fixed load transferring vehicle or in modes of operation between freely leanable and fixed.

The locking system locks or holds the vehicle in a fixed geometry. The lean drive system permits the operator to control the lean attitude of the vehicle at slow speed. It is used primarily to right the vehicle or to make minor attitude adjustments. Essentially, a vehicle in accordance with this invention is designed to start and stop as a roll fixed or quasi-fixed multi-track vehicle, as by load transferring, and to operate as a virtual leaning/balancing single-track vehicle at high speeds.

Although the operating characteristics at start and stop are divergent and different from those at high speeds, they are seamlessly integrated in reality in separate modal regimes of operation. The introduction of the mechanisms of this invention unite these two dynamic vehicle systems. The use of a lock, brake, and clutch in accordance with this invention reduces the operators workload with respect to roll control.

Instead of trying to devise full time active automatic roll control the applicant provides roll control facilities to permit the operator to control, inhibit or correct imbalance states on an intermittent basis when they occur. Thereby minimizing the amount of hardware required. Instead of developing an entirely new 100% lean control system, the applicant has developed a system to use an established well understood dynamic mode of operation and apply it to modes of operation that are problematic.

Full time lean control systems diverge from the natural balance of single track vehicles. The applicant has found that it is both difficult and unnecessary to devise systems that can automatically anticipate centripetal loads, surface changes, and driver intentions at high speed. The difficulty lies in the fact that if the roll geometry is fixed for any length of time at high speed the balance roll/yaw coupling is always compromised. The moment that lock or drive is activated it fixes or instantaneous fixes the roll geometry of the vehicle. External roll loads feed into the frame such as surface inclination and roll bumps. This causes frame stress upsets balance, and does not give the same feel of a balancing single track machine. These loads present major problems for a full time lean control system. The lean and lock system can lag in establishing a free rolling condition and in response further upset balance and balance acquisition.

Such systems, even if they are programmed to seek dynamic balance, must be fast, have sophisticated sensing and fast acting drive elements and computer control, all of which expend considerable energy. If the lean system is automated there may be control problems. In a single-track system the driver controls the lean attitude through steering, and counter-steering, weight shift, and speed control. Surface roll load cannot affect its roll attitude. In a multi-track vehicle with an unconstrained transverse subframe the subframe floats over the surface and does not transmit roll load to the chassis. In this aspect a multi-track vehicle is dynamically equivalent to a single-track vehicle. In an automated lean system a computer controlling lean sense of balance may diverge from or lag the drivers sense of balance, thereby leading to control conflicts. Programming a system to anticipate counter-steer is challenging.

If lock and drive are operative full time and under command of the operator, the operator is left with a problem of developing the capability of operating the machine in two divergent modes of control. That is, either as a free rolling balancing machine or as a leanable load transferring vehicle. This can cause operator control confusion. This confusion is overcome by this invention by permitting the machine to operate predominately as a free rolling balancing vehicle at high speed and a fixed machine at low speed. The problem is resolved by clearly defining which mode of control to use at what speed.

In the system of this invention, the locking system is not active at high speed but is readily available to assist in vehicle control. For instance, if a high wind develops, locking can be momentarily enabled to counter the wind force. That is, the locks act like ski poles, and can be used to enhance balance in specific situations. The use of drive and lock controls at high speeds to restore or enhance roll/yaw coupling on an as need basis is optimal.

In the preferred embodiment of this invention, the locking system includes a clutching, braking, and locking device. The locking system permits the operator to control direction (roll left, roll right, neither), and strength and duration of the lock, brake, and clutch action. The locking system in accordance with this invention can be applied at virtually any pivoting point between frame and the leaning sub-frame. Movement of the vehicle in both roll directions may be controlled or restricted in accordance with this invention by a twist grip or other suitable control means. The vehicle may be restricted from lean in a single direction by pressure on one side of the handlebar, by a foot control, or by other suitable control means.

The lean of the vehicle is restricted by a one-way clutching, braking, locking action mechanism which for brevity will be called a half lock. The half lock is only enabled after a threshold control torsion is reached so as to permit the vehicle to freely lean at high speeds. This threshold torsion is designed into the locking system. The single direction lock enables the operator to right himself from high lean angles when at a full stop. The single direction locks are essentially one way clutches that reduce the operators workload of righting the vehicle since it holds the position gained when in a righting mode. If the vehicle were fully locked at a high lean angle when the vehicle stopped, the operator would not be able to right the vehicle. The single direction locks also help stop sudden roll at slow speed. They also enable the operator to load transfer and make more sudden emergency turns Further, they permit the driver to store kinetic energy in the frame, thereby using a shallower lean angle and permitting faster direction changes. The half locks enable the operator to roll the vehicle freely in either direction when released, but when engaged will momentarily force or drive and hold a desired lean attitude when initiating or negotiating a turn. This permits some build up of load transfer stress in the frame since it locks the subframe and wheels in the opposite direction of intended lean while permitting continuous movement of the frame and operator in the desired direction of lean.

The opposite state is induced by reversing pressure on the half lock control. In this state riding surface changes effecting only the outside wheel will feed roll moments to the frame. This interferes with roll/yaw coupling balance of the virtual single-track vehicle, but is acceptable when actuated intermittently while cornering at high speeds. An innovative aspect of this invention is the preset required torsional input threshold. If the operator is moving in an ostensibly straight line or is in balance while cornering, the operator is in roll equilibrium so the half locks are not engaged. The vehicle without the locks engaged is the dynamic equivalent of a virtual single-track vehicle.

In accordance with this invention, since there is a lock threshold, the half lock can only be engaged in higher torque unbalanced situations such as sudden direction changes, high cornering rates or low speed or stop/start operations (where balancing forces due to kinetic energy of the vehicle is low). Hence, conventional steering, weight shift and speed control can be used to make minor lean attitude adjustments. Lean input pressure in straight line operation will not cause the vehicle to lock but rather to gradually lean as if weight is being shifted due to the threshold. In reality half-lock, cornering hard, and loading an outside wheel does not present a problematic situation in terms of balance or control since the locks broaden the bandwidth and range of roll/yaw combinations a driver can use to negotiate a turn. The centripetal force can be built up in the frame and used to upright the vehicle coming out of a turn. It is in high speed straightline motion that lock engagement is undesirable.

In straight line motion there is no preferred lean bias. From straight line motion lean must be initiated to enter a cornering mode. Any lean lock or drive will cause surface feedback or frame loads or delay that the driver must overcome just to enter a cornering attitude. This can be merely irritating to make operation difficult. To enter a cornering lean attitude from straightline from a balance state is effortless. Maintaining balance is also effortless at speeds other than very slow. The exception is operating in windy conditions. In windy conditions the lock drive offer another compensating control factor as previously set forth.

When the half locks are engaged the vehicle is dynamically converted intermittently to stable multi-track tricycle type operation. The single direction locks are actuated more automatically. At low speed, when operating on very rough terrain if the half locks frequently activate alternately they operate as virtually a full lock. That is, the full lock is activated semi-automatically.

In accordance with this invention, a lower cost human power vehicle may be provided with full locks, requiring some pressure from the operators feet on the parallelogram subframe for balancing at starts and stops. That is, the half lock and full lock action of this invention may be incorporated in a vehicle in combination or separately. If they are used in combination the full lock can be used to dynamically adjust the half lock threshold for greater control. Ideally the half lock threshold should be lowest at low speed and higher at high speed. In sophisticated embodiments the threshold can be manipulated automatically. The locks provide the vehicle with excellent stability at low speeds and when ridden on rough terrain. If the locks are engaged momentarily at high speeds, the cornering stability of the vehicle due to track width in conjunction with the vehicle lean angle will improve the cornering ability of the vehicle. A full lock in accordance with this invention is most useful for full stops and starts. The half locks have a certain amount of mechanical lash, due to the locking threshold as the roll direction changes, which may present a problem at low speed. The deficiency of the full lock is that it locks the lean drive system so as to resist up-righting input on the vehicle frame. This can lead to lean attitude awkwardness, or predicaments at low speed, unless the driver continuously manipulates locking and unlocking. In accordance with this invention the lock systems when used in combination complement each other.

A drive system in accordance with this invention permits the operator to adjust the lean attitude at low speeds. Once the proper attitude is attained the lock can be engaged or the driver can cycle between the two systems to adjust to varying operating conditions. The power demand to right the vehicle to balance at low speed is low since the operator naturally maintains the vehicle near upright at low speeds as in the normal operation of a single track vehicle. The exceptions are of course panic stops, when cornering, and the loss of balance at low speeds. The locking system of this invention greatly reduce these problems.

In accordance with this invention, automatic lean power assist or automatic locking may be provided on powered vehicles. However, full time lean power assist is not desirable. In a human powered system a compound lean and steer control system is provided at the handlebar since the drivers legs are normally used for propulsion. The handle bar can control both the lean and steering of the wheels. The control movements of the handlebar are independent of the other. That is, roll and yaw control are not directly coupled. To control lean a linkage is provided between the handlebar and the leanable parallelogram subframe. The lean control power of this system is limited by the strength of the operators arms. It is meant to be used at low speed with the vehicle near the upright balanced position where lean input is minimal. At high speed the driver essentially does not make input to lean control. Although, it can have an effect since a vehicle that has no stored fixed roll structure in roll equilibrium will react and move perceptibly to roll input. With heavier vehicles at higher speeds inertia and gyroscopic action come into play to retain and stabilize the vehicles roll attitude. The drivers hand and arms (or feet and legs) merely follow the tilt feedback due to lean.

Roll drive input from the driver in the lean drive system is essentially turned off at high speed. Surface changes and roll due or roll command for a single-track vehicle feed through the drive system. Wind roll moments can be resisted. The operator primarily provides steering, weight shift, and speed control input as in single-track vehicles.

In a powered vehicle foot controlled drive and lock control may be implemented. Foot power is sufficient to right the machine at stops and in most situation when used in conjunction with the locking systems, with motorcycle weight class vehicles. The foot drive system can be provided with a power amplifier similar to that. used in power steering. This is desirable in heavier powered vehicles. The important point is to disable and enable the system at a preset low speed through some speed detection system otherwise the paired transverse wheels cannot act as a single wheel in roll and the balance of roll/yaw coupling is compromised as previously set forth. When the drive is disabled the vehicle must be free to roll without restriction. The drive system also helps to overcome inherent drag in the locking system or in the frame to subframe pivot that restrict lean.

A tricycle type vehicle in accordance with this invention will be useful as a delivery vehicle since it has a greater load bearing capacity than a conventional bicycle or single track machine. The leaning tricycle will also be useful to those who are balanced challenged, since such a vehicle lean attitude is under driver control. There is no need to dismount or remount the vehicle when starting and stopping. A human power vehicle in accordance with this invention readily lends itself to a full enclosure of the user.

The controlled leanability mechanism in accordance with this invention is a robust and flexible design adaptable to any configuration of multi-track vehicles regardless of rider seating position or wheel layout. The mechanism is lightweight and compact. The lean and drive system of this invention is also intended for use with light vehicles that are constructed as upright tricycles or virtual tricycles. In addition to the customary form of a single steering and drive wheel in the front and two spaces wheels in the back, a tricycle may also be constructed with one driven wheel in the back and two steerable wheels in the front. The rear driven wheel may be provided with side or "training" wheels which are free to pivot, and which in straight line operation would not contribute to roll stability of the vehicle.

When cornering, in accordance with this invention, the locking and drive system could be engaged to enhance roll stability by locking and or driving the side or "training" wheels. Similarly, a quadracycle with transversely paired wheels which are permitted to pivot freely is a virtual tricycle. High speed vehicles of this type can be constructed in accordance with this invention to have enhanced rollover and cornering stability by incorporating the lock and drive system of this invention.

One other major area of consideration with respect to lean lock and drive is the overall ratio of center gravity location to platform layout and dimension. In general, if the design is driven to a very narrow track, locking capability may permit the driver to exceed the roll over capacity of the vehicle. Various strategies can be devised according to expectation and application to handle this situation. In an upright human powered tricycle, with transverse wheels only 10 inches apart, the locking system will be used primarily for start/stop operation. In cornering, locking would not offer much of an advantage. Rather, the driver would primarily balance the vehicle. If the operator and vehicle were about to tip over, the operators feet must be used to inhibit a fall.

In a powered machine the platform dimension could be increased to make rollover unlikely. Another solution would be to institute automatic velocity controls at high speed to limit unsafe torque inputs to the chassis at a given lean attitude. At low speed automatic lean drive, or roll limiters, or automatic leveling and lock can be instituted. Still another solution is to increase the threshold to lock as a function of lean angle and velocity. Further, the amount of torque the lock will hold can be limited as a function of lean angle. Excess torque would be transferred to the driver to prompt speed reduction. The operator can simply learn to operate within safe levels. At high speed, if the vehicle is operated mostly in a balanced mode, torque levels will be minimal. At a maximum lean angle of 22 degrees a leaning vehicle can sustain ½ g force independent of platform design and center of gravity location. It should be apparent to those skilled in the art that there are sufficient device and structure alternatives in the lock and drive to handle these potential problems.

BRIEF DESCRIPTION OF THE DRAWINGS

FIG. 9A is a top perspective view of the locking mechanism of the first embodiment of this invention.

FIG. 9B is a bottom perspective view of the locking mechanism of the first embodiment of this invention.

FIG. 10 is a front view of the steering and control portion of a second embodiment of this invention which provides a locking system with a lean drive system.

DETAIL DESCRIPTION OF THE PREFERRED EMBODIMENTS

Figure 1:
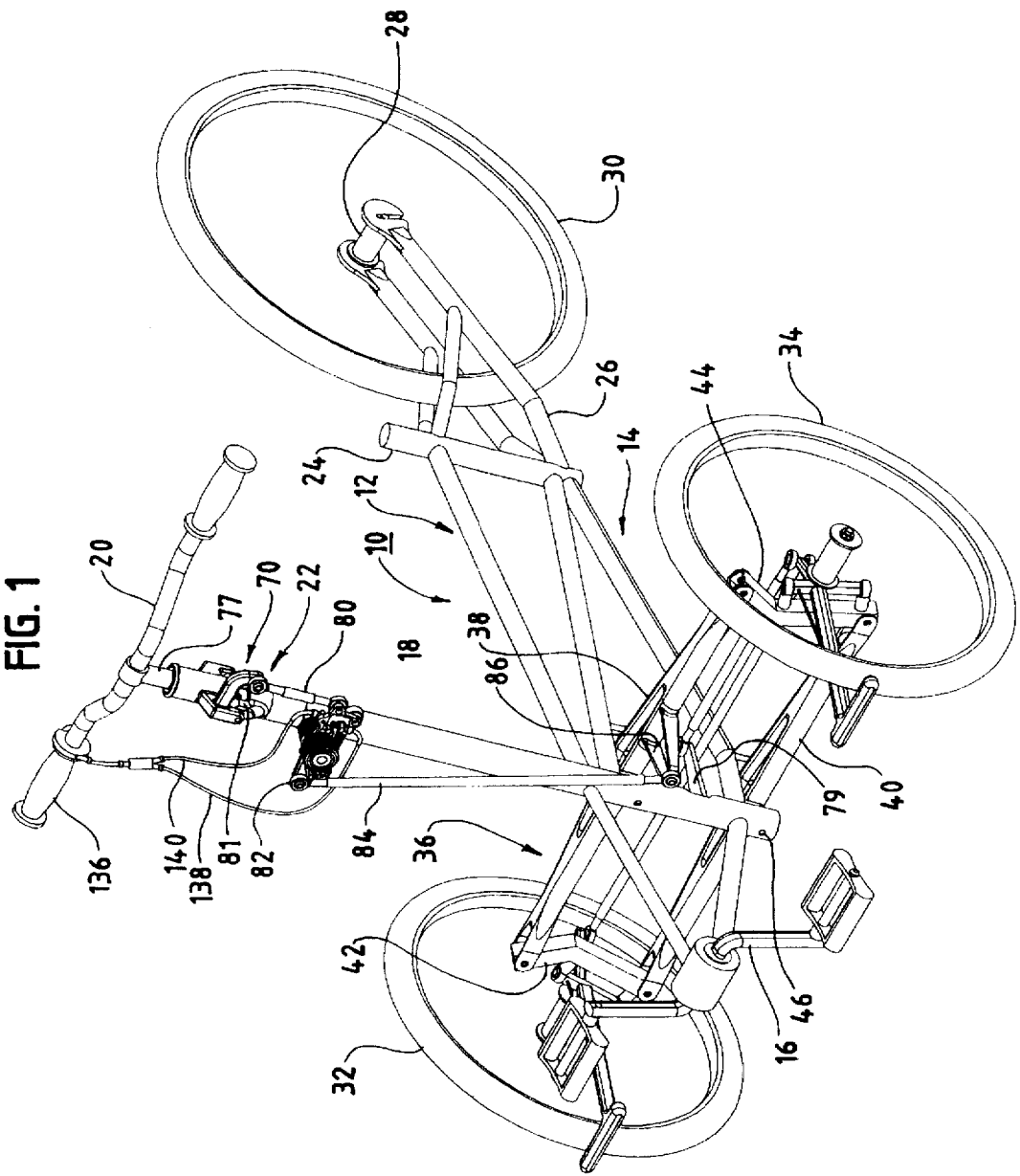
FIG. 1 is a perspective view of a tricycle type human powered vehicle incorporating a first embodiment of this invention.
Figure 2:
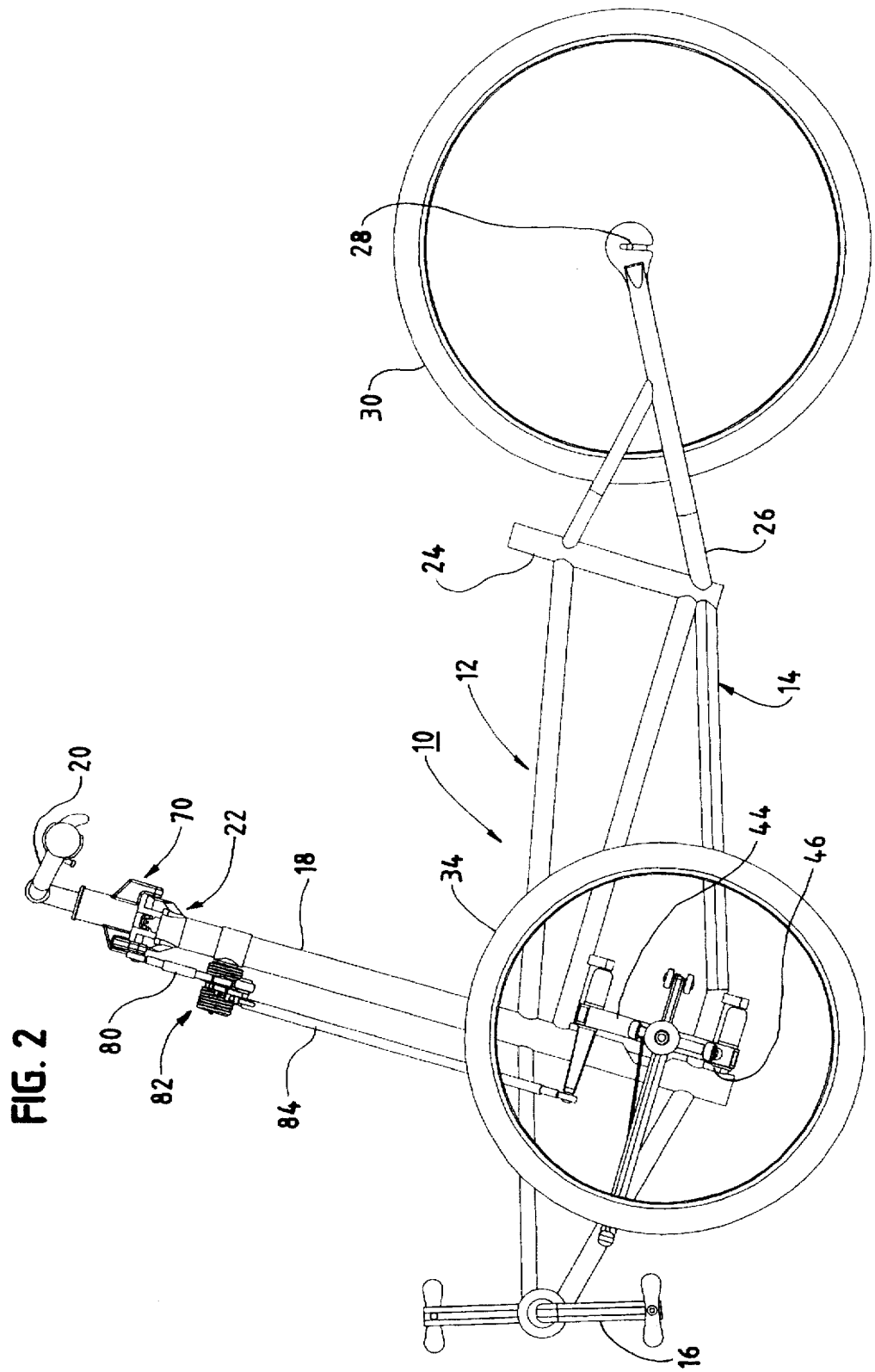
FIG. 2 is a side view of the first embodiment of this invention.
Figure 3:
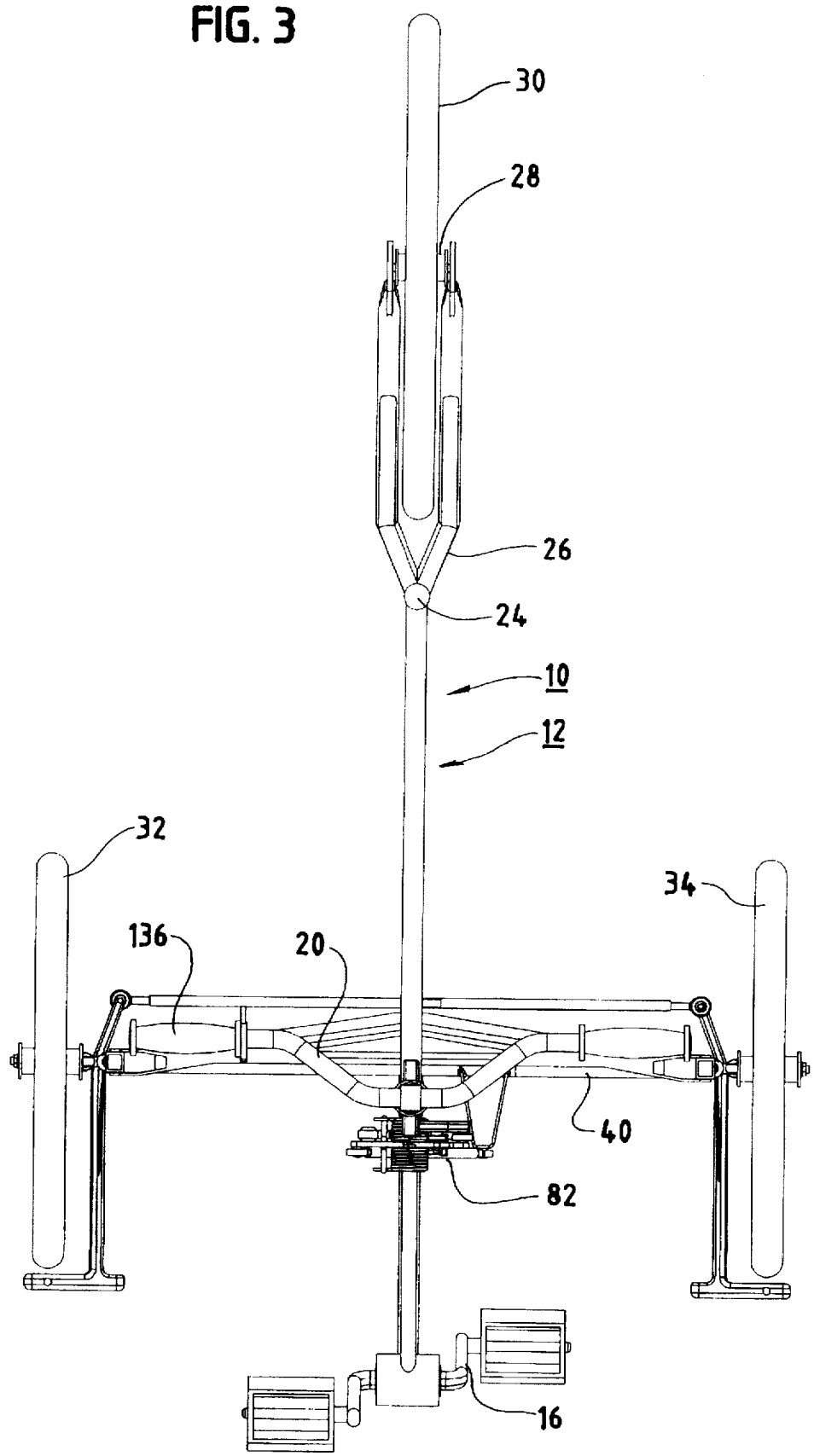
FIG. 3 is a top view of the first embodiment of this invention.
Figure 4:
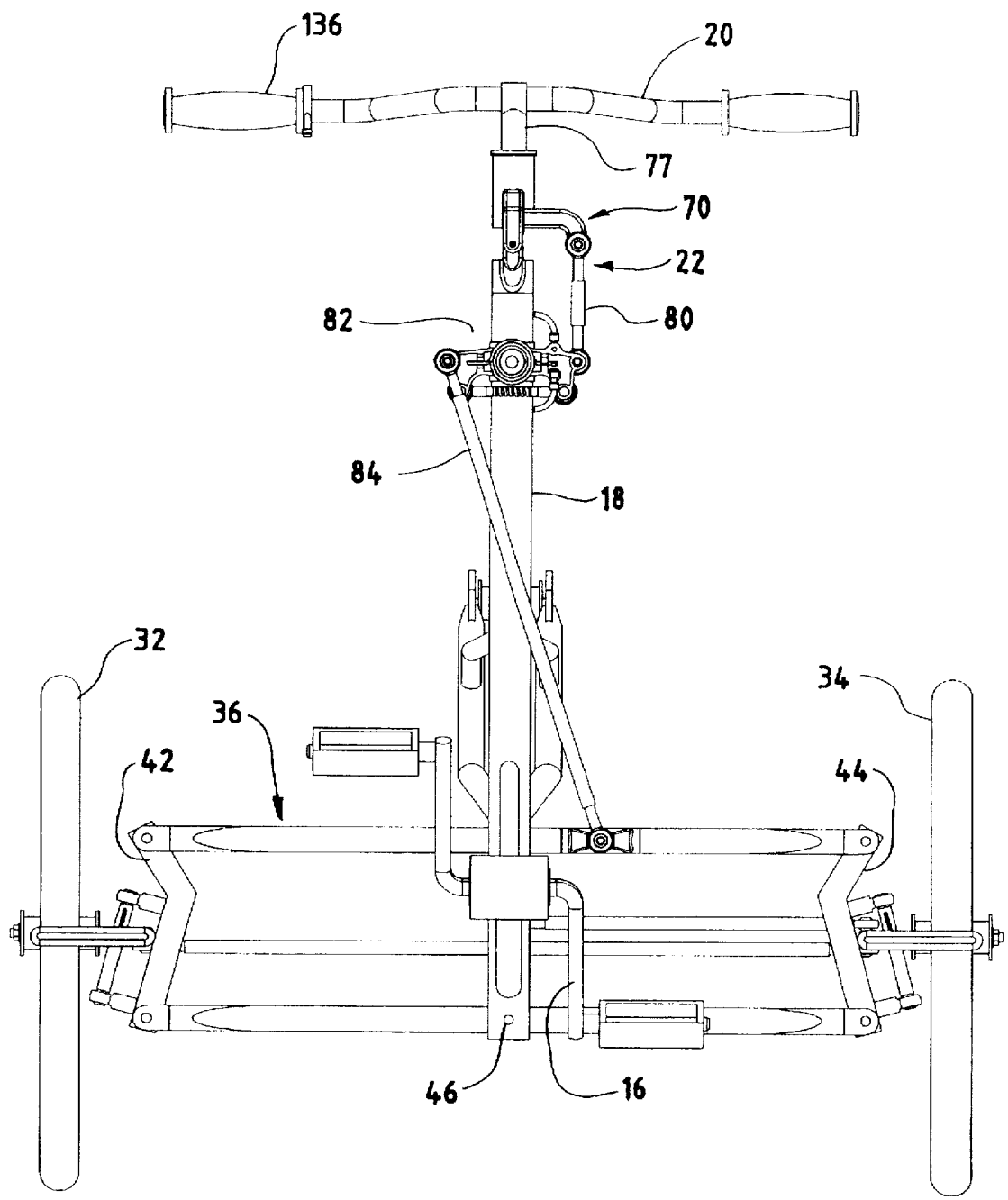
FIG. 4 is a front view of the first embodiment of this invention showing the tricycle type vehicle in a first vertical position.

Referring to FIGS. 1–6, the general construction of a first embodiment of this invention in the form of a recumbent human powered tricycle 10 will described. A central frame 12 has an elongated central portion 14, which supports a pedal crank 16 at the front, and a first generally vertical column 18 for supporting handlebars 20 and control mechanism 22. A second column 24 is provided toward the rear of the frame for supporting a seat having a backrest for recumbent seating (not shown) for a rider, and a fork 26 is provided at the rear of the frame for supporting the axle 28 of a rear wheel 30.

Figure 6:
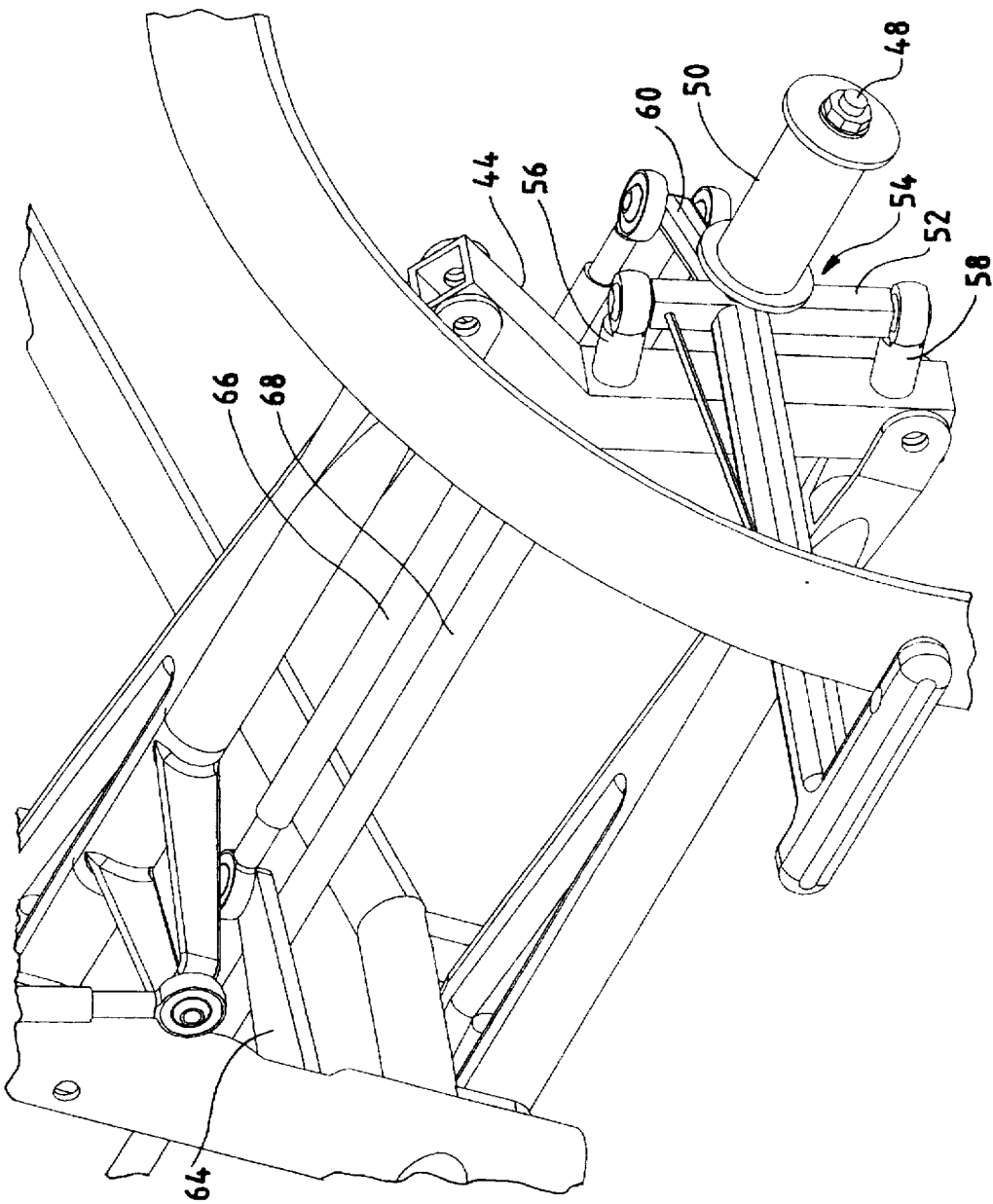
FIG. 6 is an enlarged perspective view of the left front wheel and supporting structure of the first embodiment of this invention.

A pair of front wheels 32 and 34 are supported from the central frame 12 by a parallelogram structure 36. The parallelogram structure 36 consists of a pair of horizontal cross-members 38 and 40 and vertical end members 42 and 44. Lower horizontal cross member 40 is pivotally secured to and supported from the lower end of column 18 by a cylindrical member 46. As best shown in FIG. 6, an axle 48 which supports wheel hub 50 of left wheel 34 is supported from a vertical member 52 of a cross-shaped member 54. The vertical member 52 is in turn pivotally supported on the vertical end member 44 by two arms 56 and 58.

Steering of the tricycle is accomplished by a linkage connecting an arm 60 of the cross-shaped member 54 to the handlebars 20. The linkage includes a shaft 62 extending through column 18 from the handlebars 20 to a lever 64 extending from the lower end of the shaft 62. A tie rod 66 connects the lever 64 to the arm 60. The arm 60 is in turn connected to the cross-shaped member supporting the right wheel 32 by a tie rod 68.

Figure 7:
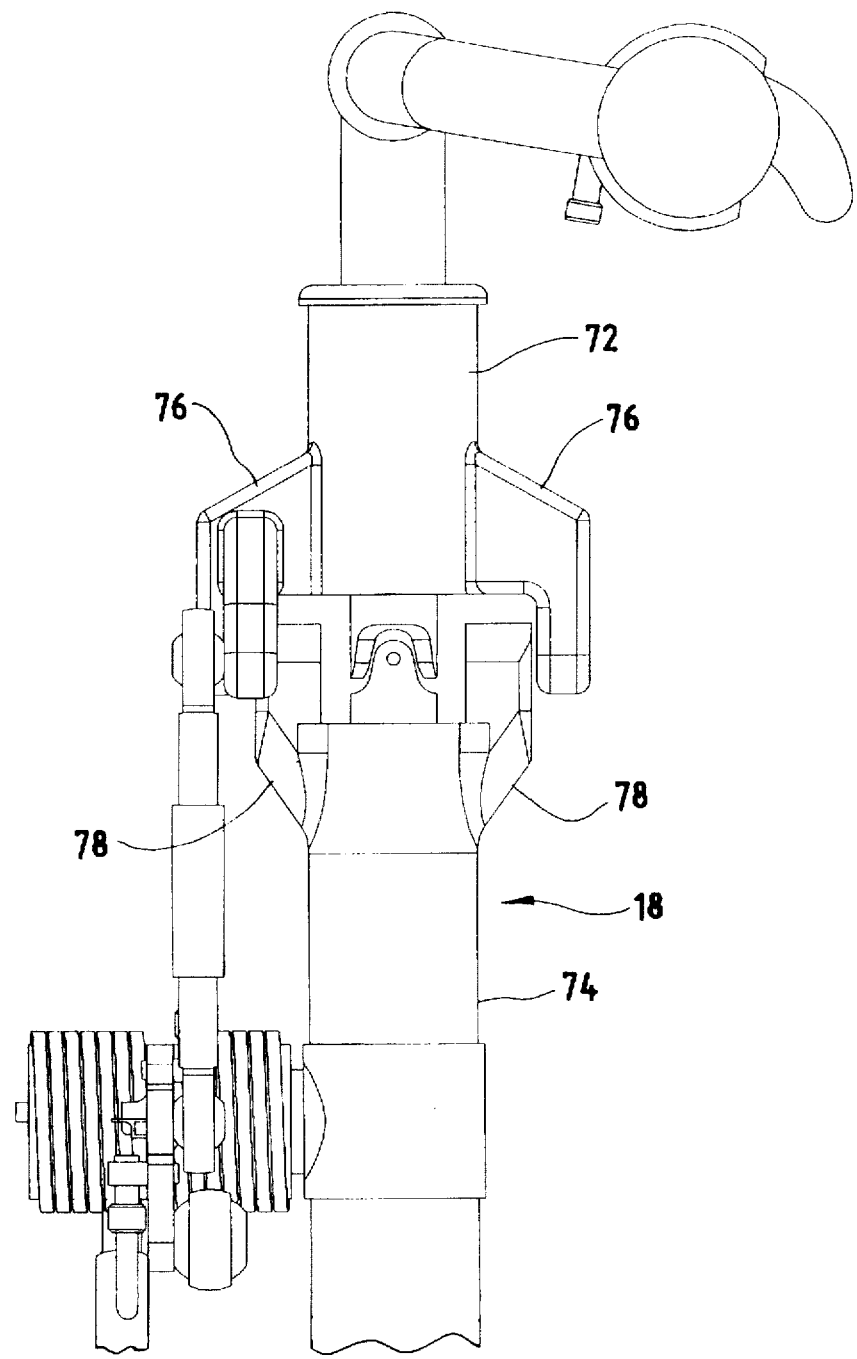
FIG. 7 is a enlarged side view of the steering and control mechanism of the first embodiment of this invention.

This first embodiment of the invention implements both an integrated manually powered lean drive system and a position holding and locking system with both half and full locks and related controls. A linkage is provided to cause the wheels to lean or be tilted when the handlebars 20 are pivoted about a pivot point located at 70 in FIG. 1. Referring to FIG. 7 in particular, the column 18 is provided with an upper portion 72 and a lower portion 74. The adjoining end of portions 72 and 74 are each provided with a pair of arms 76 and 78 respectively, the free ends of which are pivotally secured to each other. A steering shaft 77 includes portions housed within portions 72 and 74 of column 18, with a universal joint connecting the portions at pivot point 70. The upper end of the shaft 77 is connected to the handlebar 20, and the lower end to an operating lever 79. This arrangement permits the handlebar to steer and tilt independently. Pivotal movement of the handlebars 20 is transmitted through the upper portion 72 to a rod 80, selective or controllable motion or force transmission means 82, rod 84, and V-shaped bracket 86 to horizontal cross-member 38.

Figure 5:
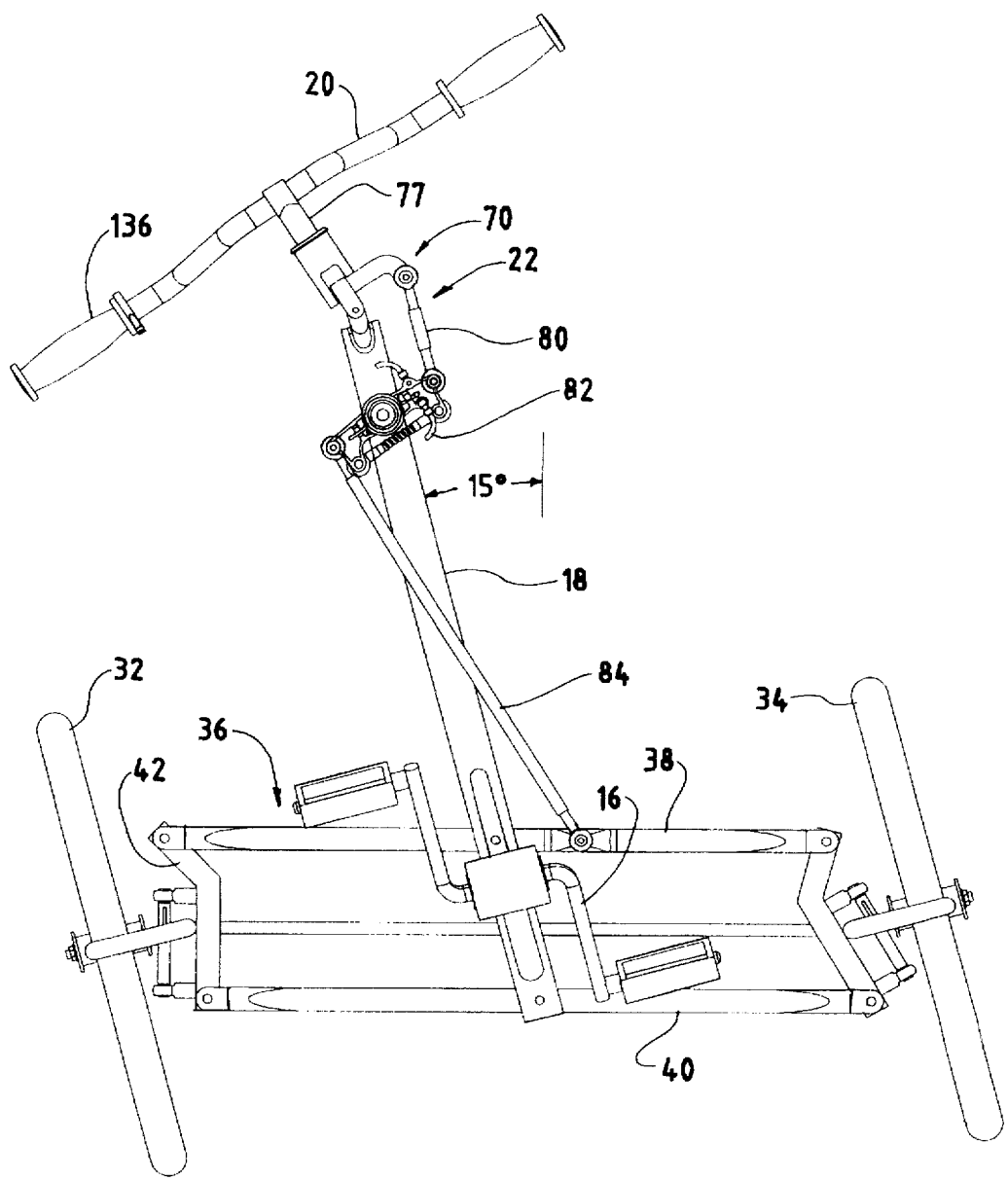
FIG. 5 is a front view of the first embodiment of this invention showing the tricycle type vehicle in a second leaning position.

Tilting of the handlebars 20 downward on the left, caused rod 80 to move downward and rod 84 to move upward. The upward movement of rod 84 pulls cross-member 38 toward the right wheel 32, thereby leaning or tilting the top of the wheels 32 and 34 to the right. Similarly, tilting of the handlebars 20 downward on the right as shown in FIG. 5, causes the rod 80 to move upward and rod 84 downward to push cross-member 38 toward the left wheel 34, thereby leaning or tilting the top of the wheels 32 and 34 to the left.

While motion transmission arrangements for causing the tilting of a vehicles wheels with tilting of the steering means has been disclosed in the prior art, the inclusion of a selective or controllable motion or force transmission means 82 in the motion transmission arrangement as embodied in this invention has not been shown in the prior art.

Figure 8:
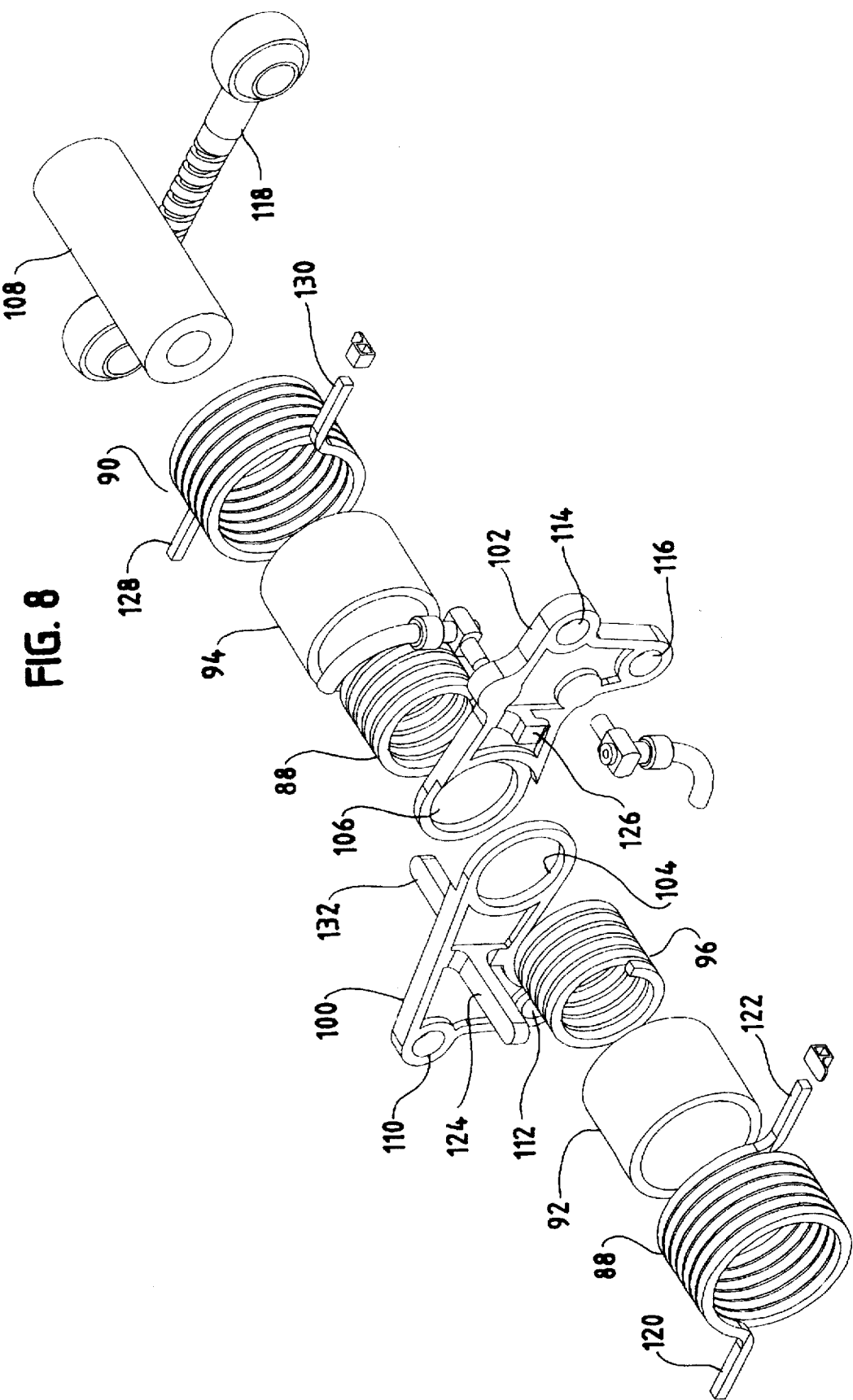
FIG. 8 is an exploded perspective view of the control mechanism of the first embodiment of this invention.

Referring to FIGS. 8 and 9, one embodiment of the selective or controllable motion or force transmission means 82 in accordance with this invention will be described. Two outer coil springs 88 and 90 are received over two cylindrical tubes 92 and 94 respectively. Received within the tubes 92 and 94 are inner coil springs 96 and 98 respectively. As shown, springs 96 and 98 provide one way clutch action by expanding and locking tubes 92 and 94 to core tube 108 in one direction and contracting and permitting motion in the opposite direction. Placed between the pairs of inner and outer coil springs and tubes are a pair of torque arms 100 and 102. Passing through holes 104 and 106 in torque arms 100 and 102 respectively and the inner coil springs 96 and 98 is an elongated core tube 108. The core tube 108 is rigidly supported from the column 18. All locking, dampening, clutching and braking action is terminated into the fixed chassis through core tube 108. Each of the torque arms 100 and 102 has a second set of holes 110 and 112, and 114 and 116 respectively located at the ends of the torque arms opposite the holes 104 and 106. An extensible and compressible link 118 is connected between holes 112 and 116. The link 118 is a two way adjustable spring that sets the input torque level threshold at which the directional locks will initiate locking. Rod 80 is pivotally secured to torque arm 102 at hole 114, while rod 84 is pivotally secured to torque arm 100 at hole 110.

The ends of the inner coil springs 96 and 98 located adjacent to the torque arms 100 and 102 respectively are provided with tangentially extending ends which engage abutments on the torque arms. Both ends of the outer coil springs 88 and 90 are provided with tangentially extending ends which engage abutments on the torque arms. The tangentially extending ends 120 and 122 of coil spring 88 engage abutments 124 on torque arm 100 and 126 on torque arm 102. Similarly, tangentially extending ends 128 and 130 of coil spring 90 engage abutments 132 on torque arm 100 and an abutment ,not shown, on the opposite side of torque arm 102 from abutment 126.

In accordance with well known principals, rotating one end of a coil spring in the direction to unwind the spring causes the springs coil diameter to expand, while rotation in the opposite direction causes the springs coil diameter to contract. Thus, an upward force applied to torque arm 102 by rod 80 will cause the diameter of outer coil spring 90 to contract due to the upward force applied to tangentially extending end 130. The inner surface of the spring 90 will engage the outer surface of tube 94, and tangentially extending end 128 will push down on abutment 132 of torque arm 100 to move rod 84 downward. The springs will hold the rods 80 and 84 in the position caused by downward movement of rod 80, until the handlebars are tilted or leaned to the right, in which case the springs will be released.

In a similar manner, downward movement of rod 80 will cause the diameter of outer coil spring 88 to contract due to the downward force applied to tangentially extending end 122. The inner surface of the spring 88 will engage the outer surface of tube 92, and tangentially extending end 120 will push upward on abutment 124 of torque arm 100 to move rod 84 upward. The springs will hold the rods 80 and 84 in the position caused by upward movement of rod 80, until the handlebars are tilted or leaned to the left, in which case the springs will be released.

The operation of the springs 88 and 96 with tube 92 and springs 90 and 98 with tube 94 will provide the desired performance in accordance with this invention, and has been presented in FIG. 8 as a simple structure for explaining this invention. However, it is recognized that the springs 88 and 96 and 90 and 98 as shown are not being used in accordance with preferred design criterion. That is, forces should preferably not be applied to radially extending ends of the springs such as 120 and 122, and preferably forces should not be transferred by expansion of coiled springs, such as that of spring 96 in tube 92 and spring 88 in tube 94. The substitution of more suitable clutch or locking mechanisms will be apparent to those skilled in the art.

While in one embodiment of this invention the locking and unlocking of the lean mechanism is by movement of the handlebars only, in another embodiment a twist grip actuation of the selective or controllable motion or force transmission means 82 may be provided. As shown in FIG. 1, a rotatable twist grip 136 is provided on the handlebars 20, and is connected by bowden tubes 138 and 140 to the torque arm 102. Twisting of the grip 136 will cause the cables in tubes 138 and 140 to simultaneously rotate torque arms 100 and 102 to tighten and engage springs 88 and 90 with tubes 92 and 94, thereby initiating both half locks together so as to effect a full lock in both lean directions. The twist grip 136 may also be actuated to dynamically effect the threshold at which the half locks will engage. While both methods of actuation of the selective or controllable motion or force transmission means 82 are shown in FIG. 1, it is within the purview of this invention to also provide either method independently.

Referring to FIG. 10, a second embodiment of this invention will be described. Throughout the FIGURES, the same numerals are used to identify corresponding parts. This embodiment is provided with the same half and full locking system as shown in FIG.8, except that it is not integrated with the lean drive system. This embodiment provides only locking lean control. In this embodiment leaning or tilting of the handlebars 20 is linked to the rod 84 by a pair of bowden cables 142 and 144. The upper end of lower portion 74 and the lower end of upper portion 72 of the column 18 are provided with brackets 146 and 148 respectively. The housing of cables 142 and 144 are secured to brackets 146, while the cores are secured to brackets 148, so as to provide inputs to drive the half locks. The input from the twist grip 136 through the cables 138 and 140 initiate the full lock in the same manner as in the previously described embodiment.

Torque arms 150 and 152 which are pivotally supported on lower portion 77 of column 18 are each provided with upwardly and downwardly extending arms 154 and 156 respectively. The upper end of rod 84 is pivotally secured to torque arm 150. The housing of cable 141 is secured to the downwardly extending arm 154 of torque arm 150, while the core is secured to the downwardly extending arm 154 or torque arm 152. Thus, if the handlebar is leaned to the left in operation, cable 141 will pull the downwardly extending arms 154 of torque arms 150 and 152 toward each other with a downward movement of rod 84 resulting, thus engaging a half lock. Lean of the handlebars to the right in operation will result in cable 144 moving rod 84 upward to engage the half lock in that direction.

Figure 11:
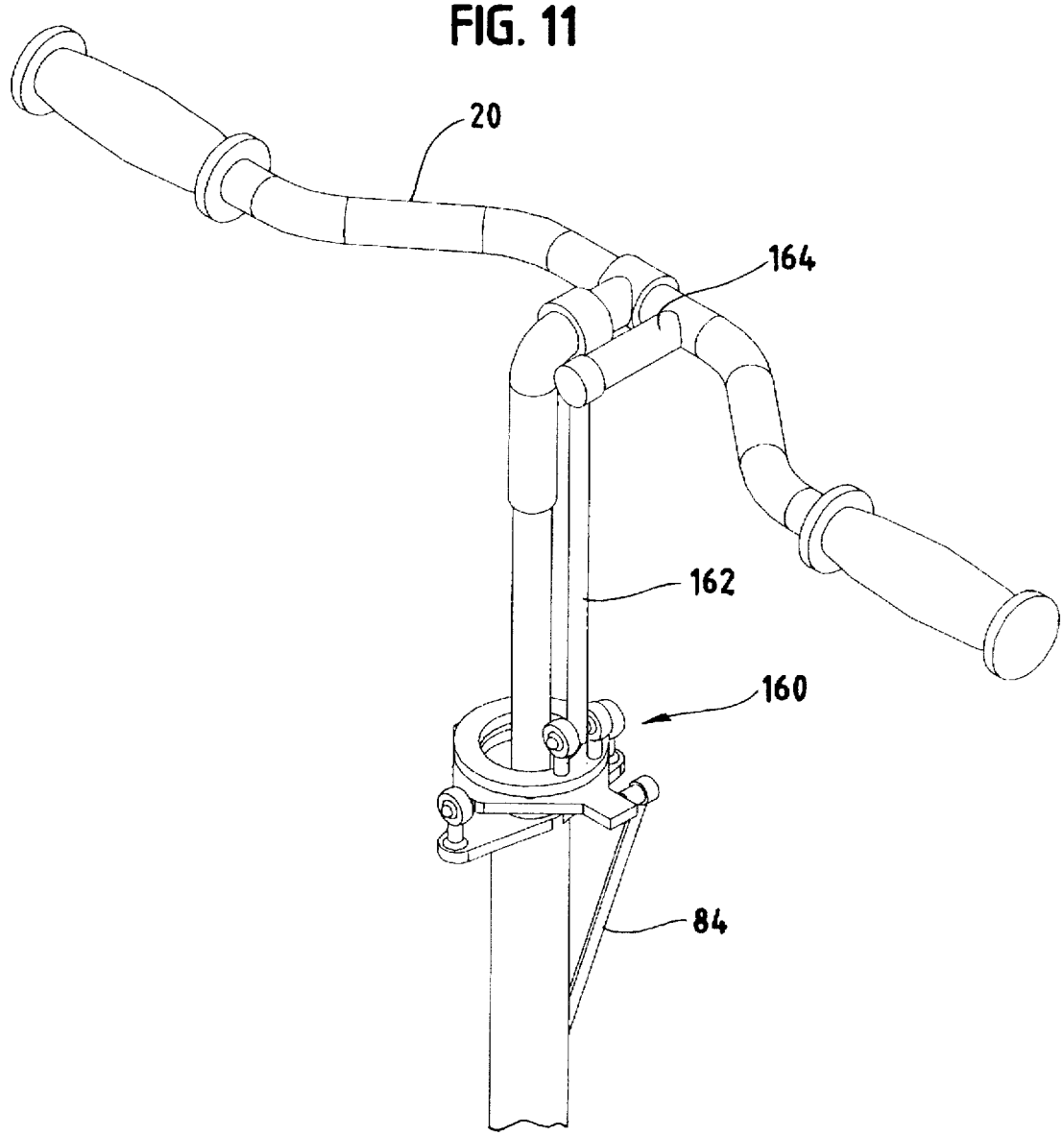
FIG. 11 is a perspective view of the steering and control portion of a third embodiment of this invention having a lean drive system without a locking system.
Figure 12:
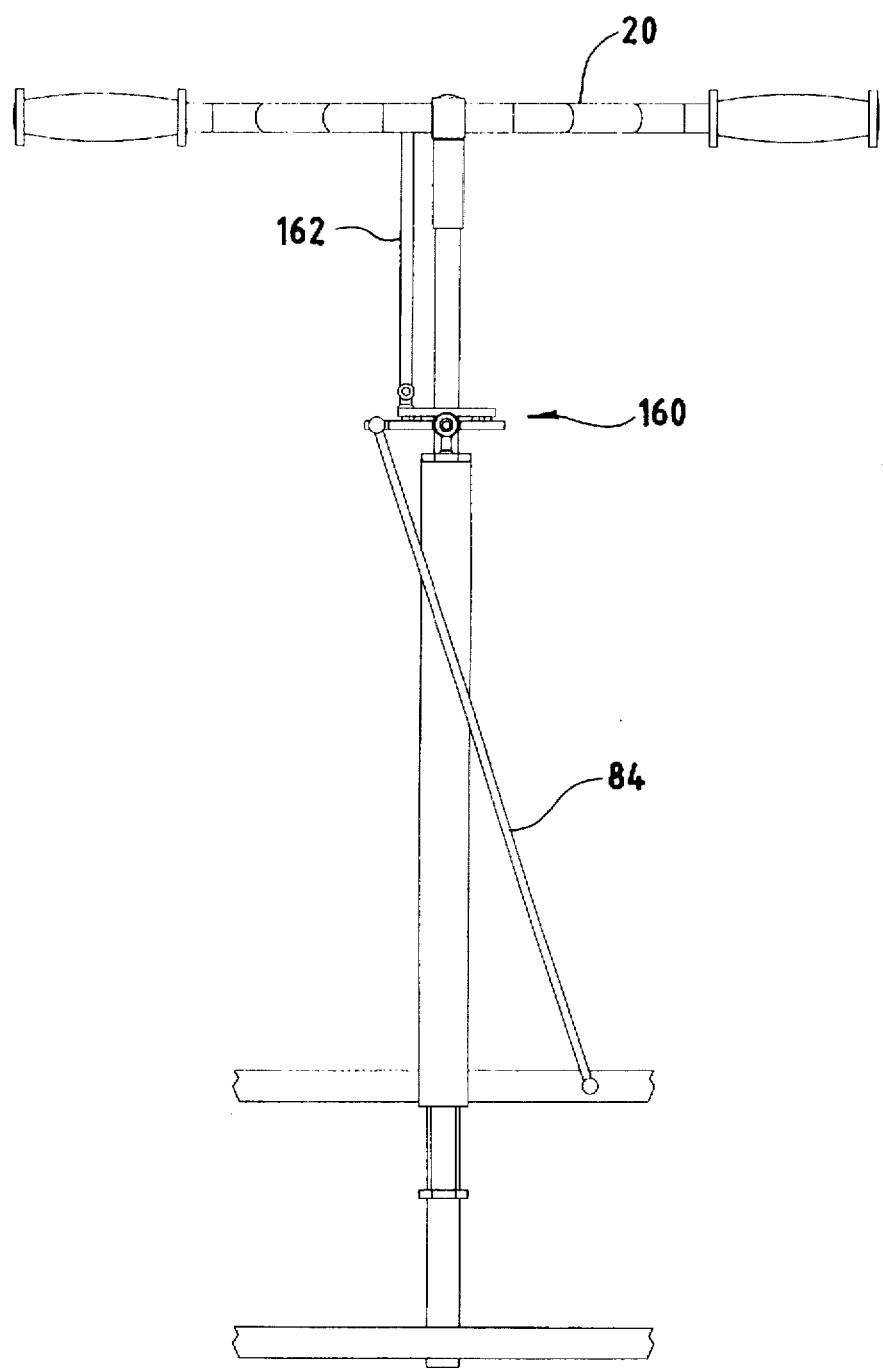
FIG. 12 is a front elevation view of the third embodiment of this invention.

Referring to FIGS. 11 and 12, in a third embodiment of this invention the leaning of the handlebars is transferred to the rod 84 by a swash plate assembly 160. Lean of the handlebars is transferred to the swash plate assembly by a rod 162 pivotally attached to a post 164 extending from the handlebars 20. In this embodiment the use of the swash plate assembly eliminates the need for the U-joint of the first embodiment. This embodiment also illustrates a lean drive system without an integrated locking system.

Figure 13:
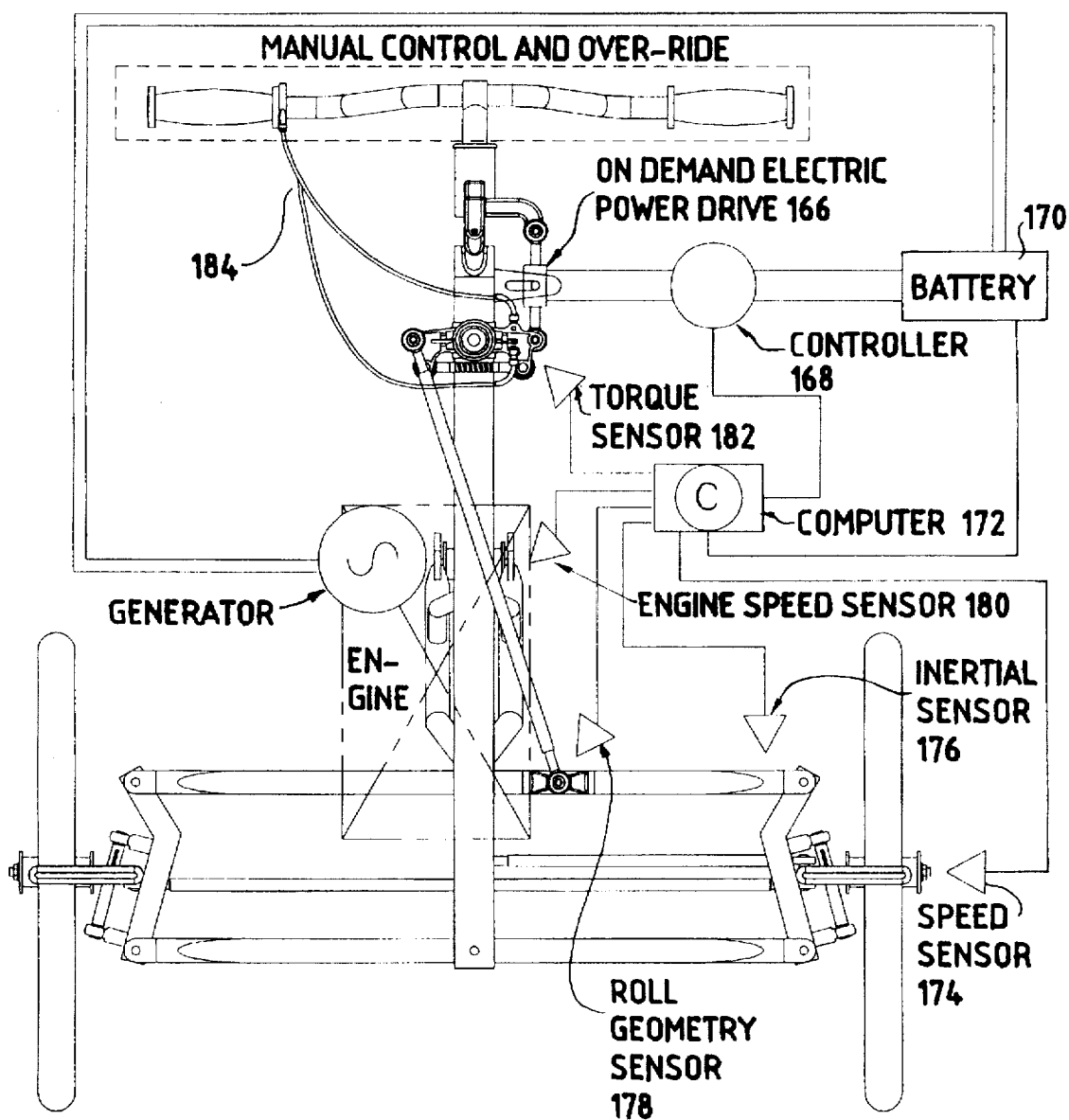
FIG. 13 is a front elevation view of a fourth embodiment of this invention, superimposed with a block diagram of a control mechanism.

FIG. 13 illustrates a fourth embodiment of this invention wherein the previously described principals of the invention are applied to a non-human powered vehicle. Leaning of the wheels is powered by an on demand electric power drive 166. Other types of power drive could also be used. This embodiment is intended for use with the heaviest and most powerful, fastest, expensive and sophisticated vehicles of this type. The power drive is energized through a controller which receives electrical energy from a battery 170 and control signals from a computer 172. The computer in turn receives signals from a plurality of sensors, such as speed sensor 174, inertial sensor 176, roll geometry sensor 178, engine speed sensor 180, and torque sensor 182. The computer program operates locking and drive in the same manner that automatic braking systems now control brakes on some motorized vehicles. Again, it is important that the lean drive system not interfere with roll freedom of the vehicle at high speeds. The onboard computer must enable and disable the power assist on the appropriate operating conditions. A manual control and over-ride system 184, similar in operation to those previously described is also provided. When a power assisted lean drive is used, a backup power source such as a battery should be supplied.

Figure 14:
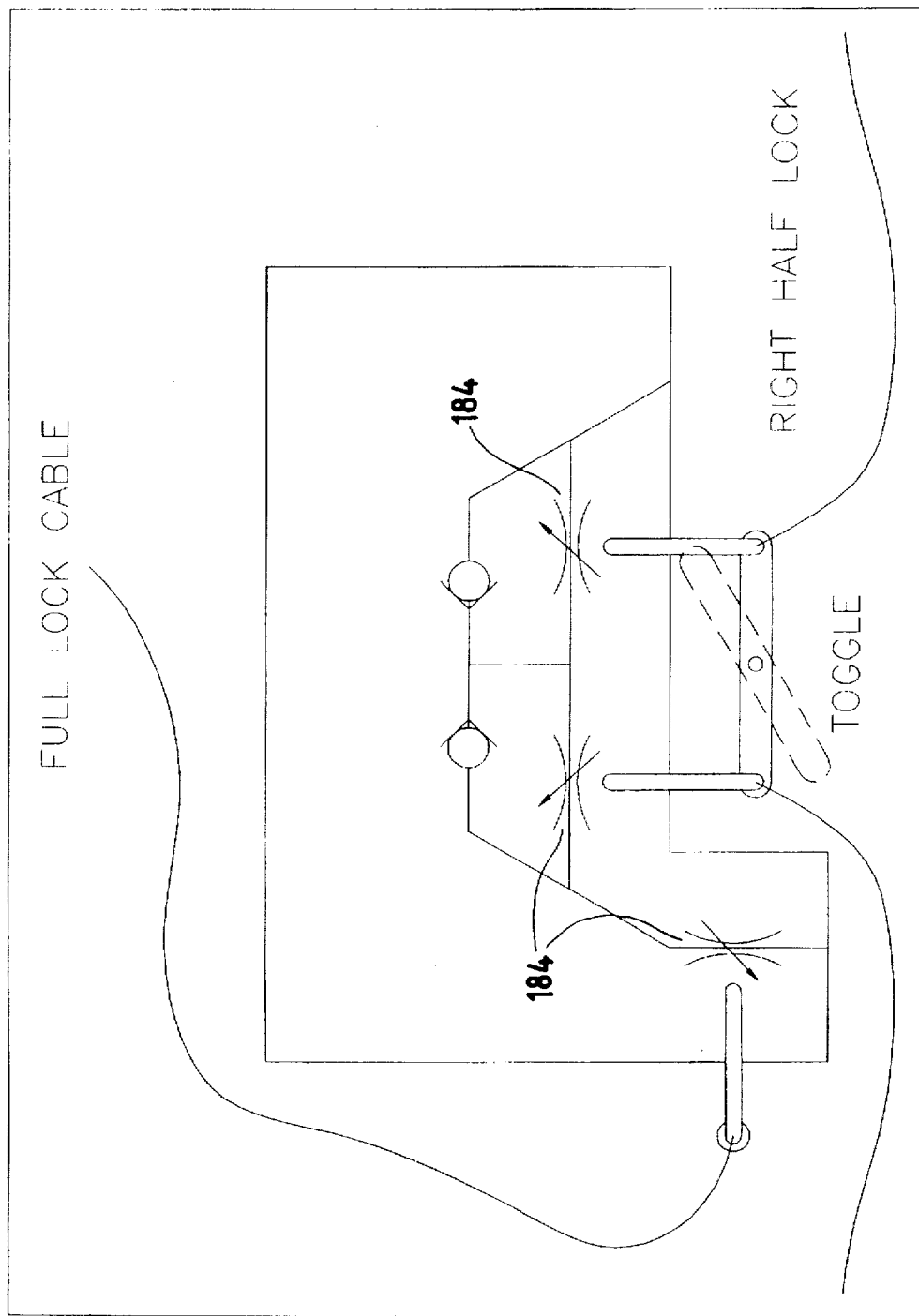
FIG. 14 is a schematic drawing of a control system in accordance with a fifth embodiment of this invention.
Figure 15:
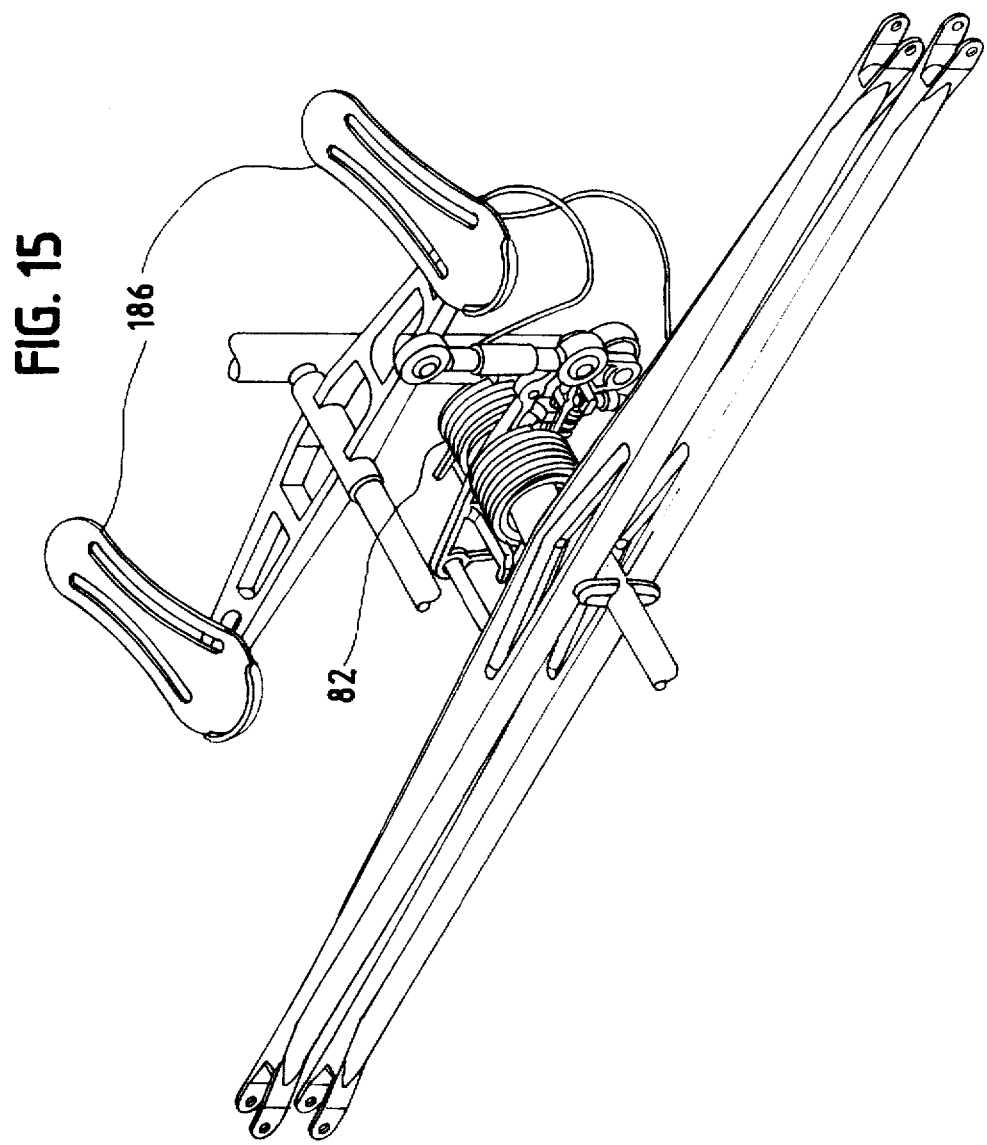
FIG. 15 is a perspective view of a control mechanism in accordance with a sixth embodiment of this invention having a foot controlled lock and lean drive system.

In FIG. 14 a fifth embodiment of the invention is schematically illustrated. This embodiment is intended to illustrate another desirable form of this invention wherein locking of lean of the vehicle may be in both directions of lean, i.e. full lock, or only to the right or left, i.e. right or left half lock. As shown, this embodiment has valving for a power or un-powered assist in a hydraulic circuit system with flow control devices 184 actuated by cables. The system is a hydraulic equivalent of the mechanical locking system of the first embodiment. The half locks are normally open paired parallel variable restrictors and check valves. At preset levels, cables 186 and 187 from a handlebar 20 as shown in FIG. 10 will toggle and restrict flow through the variable restrictor. When the restrictor is closed the other is open but flow through the check valve permits flow in only one direction at a time to a locking control cylinder not shown. Cable 188 will restrict and cut off flow in both directions simultaneously.

A sixth embodiment of this invention is set forth in FIG. The selective or controllable motion or force transmission means 82 is shown to be similar to that employed in the first embodiment. However actuation of the mechanism is shown to be provided by a pair of foot pedals 186. This embodiment is believed to be particularly applicable to powered vehicles where the drivers legs are not used for propulsion. It contains both an integrated locking system with the functionality and purpose of the first embodiment. Motorcycle weight and power class machines would most likely utilize this system.

Figure 16:
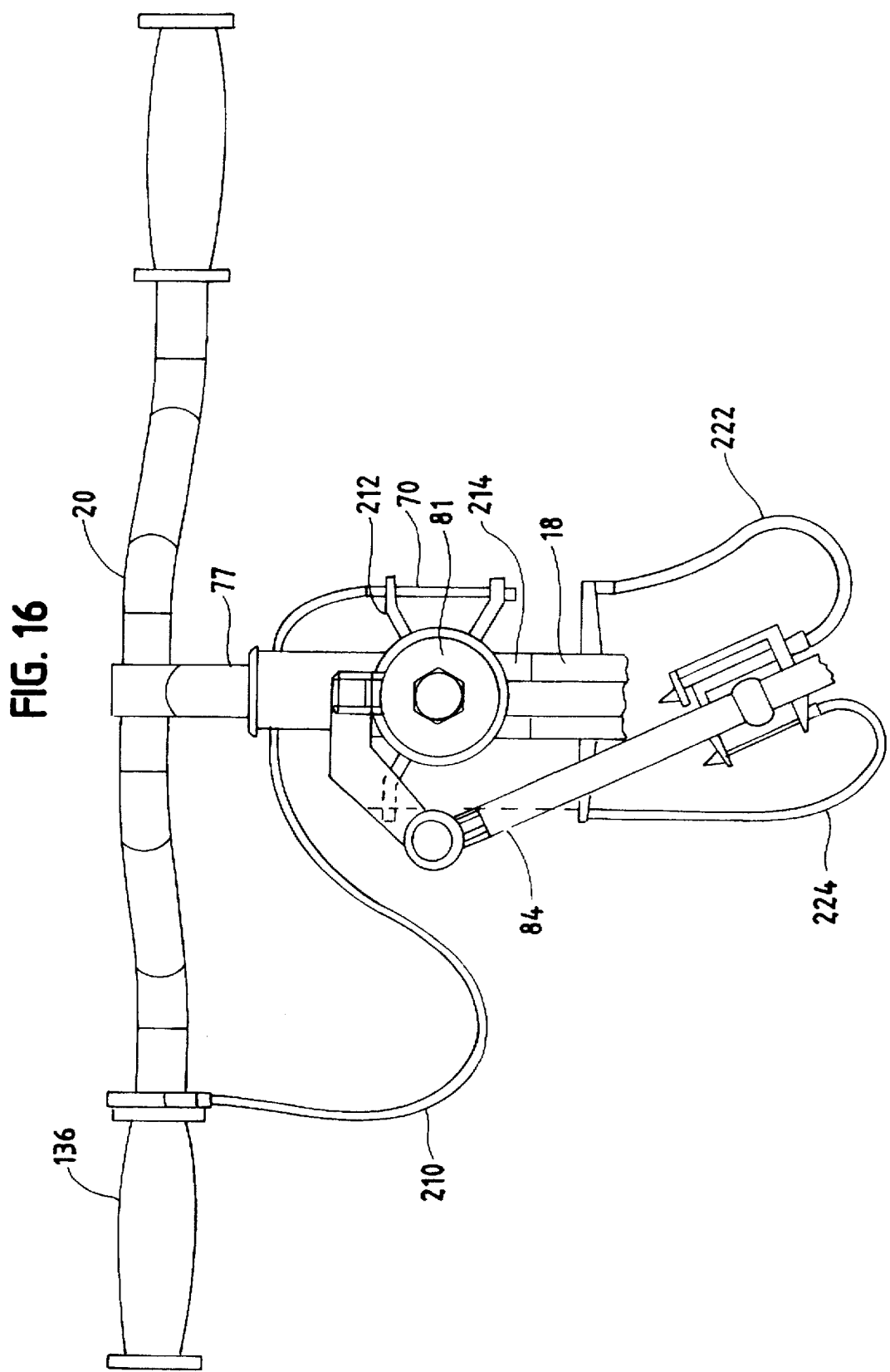
FIG. 16 is a partial front elevation view of a seventh embodiment of this invention.
Figure 17:
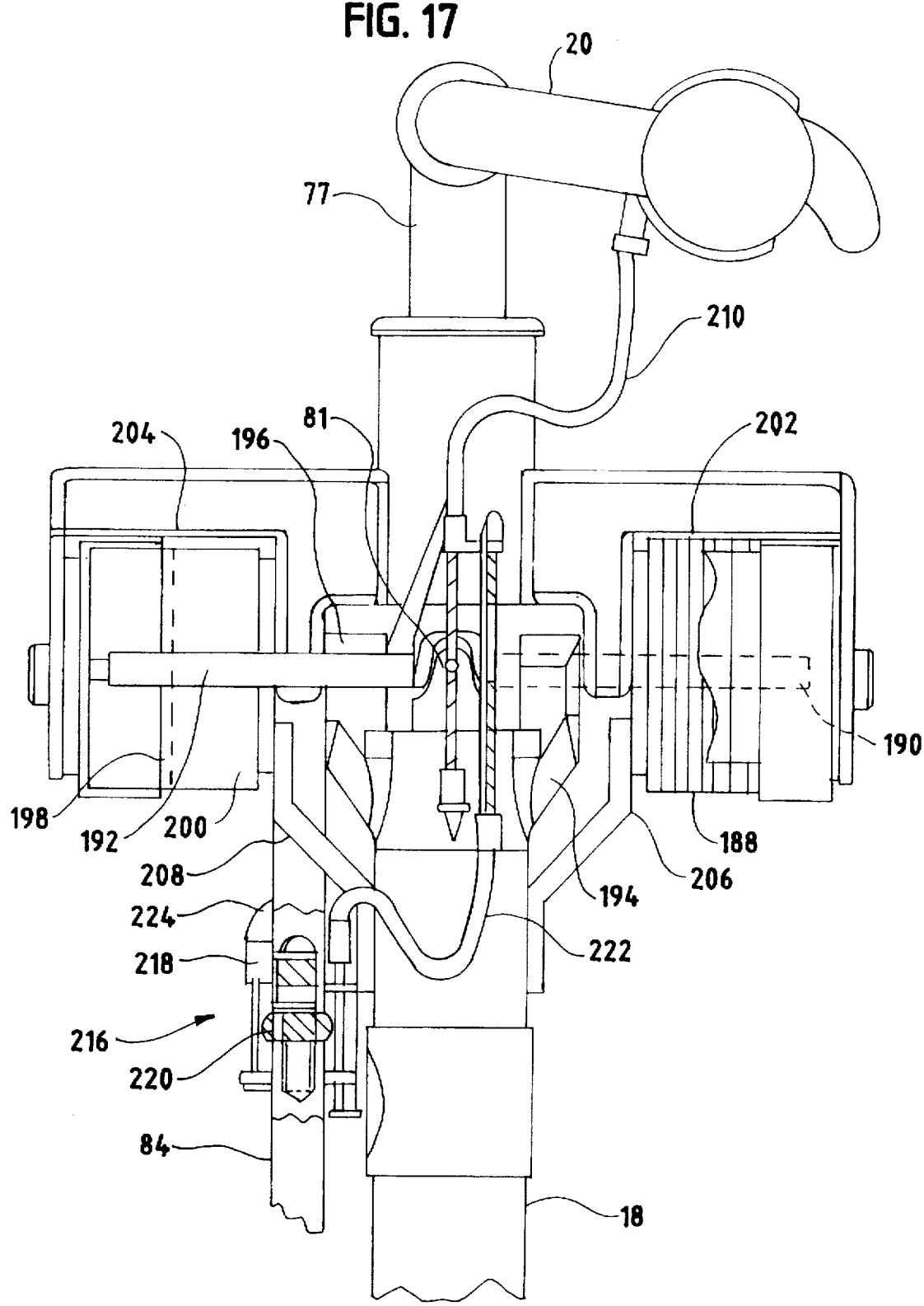
FIG. 17 is a partial side elevation view of the seventh embodiment of this invention.

Finally, a seventh embodiment of this invention is shown in FIGS. 16 and 17. The lean drive, and lock and half-lock mechanisms of this embodiment are shown as would be installed on the tricycle 10 shown in FIG. 1. Components of the seventh embodiment shown in FIGS. 16 and 17 which correspond to those shown in FIGS. 1–9 are identified by the same numerals. In this seventh embodiment a simpler two wrap spring system provides the functions of half lock and full lock. This embodiment is particularly applicable to light weight leaning vehicles. Two brake clutch type wrap springs, one of which 188 is shown in FIG. 17 are supported in front of and behind the vertical column 18 on shafts 190 and 192, which are rigidly supported from the lower section of column 18 by brackets 194 and 196. The wrap springs having the same rotation, that is either clockwise or counterclockwise are used. Each of the shafts in turn support two side by side first cylindrical members. First and second cylindrical members 198 and 200 respectively are shown supported by shaft 192. The first and second cylindrical members are located under a wrap spring, one of which 188 is shown. The wrap springs are snugly fit or wrapped around the first and second cylindrical members 198 and 200, so as to provide an interference fit. One of the first or second cylindrical members of each pair is fixed to the shaft 190 or 192, such that it can not rotate with respect thereto. As shown, first cylindrical member 198 is fixed to shaft 192. The second cylindrical member 200 is attached to a brake arm 208 that moves in relation to the leanable subframe. Similarly, the second cylindrical member on shaft 190 is attached to a brake arm 206. Collars 202 and 204 surround the wrap springs. As mounted on the shafts, each of the wrap springs, and associated first and second cylindrical members face and mirror each other and provide clutching and locking in opposite directions of tilt of the handlebar and subframe. Control collars 202 and 204 are each secured to tang on one end of the underlying spring. Collar 202 being secured to a tang on spring 188. The tangs at the opposite ends of the springs are secured such that they can not rotate with respect to the shafts 190 and 192, and therefor first cylindrical member 198. Both of the collars may be actuated in the direction to tighten the springs by twisting the twist grip 136. As shown in FIGS. 16 and 17, twisting motion of the twist grip 136 is transmitted to the collars by the cable in bowden tube 210 acting on arms 212 and 214 extending from the control collars 202 and 204. To insure the application of equal force to both collars, the end of the cable of the bowden tube may be provided with a member which pulls on a cable without being secured thereto, such that equal forces are applied to the ends of the cable which are secured to the arms 212 and 214. Depending upon the twisting force applied to the twist grip the actuating force applied to the arms 212 and 214 and the spring will either slow or lock the main chassis and the subframe from leaning in either direction with respect to each other.

To provide half locks in accordance with this invention, mechanical arrangements are provided to apply force to the collars 202 and 204 derived from tilts of the handlebars with respect to the main chassis. An extensible and retractable portion 216 is provided in lean control rod 84. Push and pull buffer springs 218 and 220 are provide in portion 216, such that the portions of lean control rod 84 on either side of portion 2L6, may move with respect to each when the elastic limit of one or the other of the springs 218 and 220 is exceeded by a high compressive or extensive force being applied to the portion 216. When the elastic limit is exceeded, the portions of the control rod 84 on either side of portion 216 will move with respect to each other. Depending on whether this movement results in the compression or extension of the control rod 216, a force is applied to one or the other of the collars 202 and 204, to lock or partially lock or resist tilting of the main chassis with respect to the subframe. This movement is transmitted as a force to the collars 202 and 204 by bowden cable assemblies 222 and 224 respectively. The tube of each bowden cable assemble is secured at one end to a portion of the control rod 84 adjacent the portion 216, while the cable is secure to the portion of the control rod on the opposite side of the portion 216.

It should be recognized that the actuating movement can be taken off of the lean drive system wherever there are tension and compression forces in the drive linkage. For instance, it could be taken from the upper portion of the column 80, that is the handlebars 20 at location 70. Wherever the actuating movement is taken, there has to be an imbalanced high torque situation for actuation of one or the other of the wrap springs 188 to provide a half lock condition. One situation in which the imbalance high torque situation exists, is when at a stop and the machine is leaning over out of balance. In this situation one wrap spring is actuated by an up-righting force applied to the handlebar 20, to hold the vehicle from falling further.

The buffer springs such as 218 and 219 are added to the half lock toggling actuating system to insure a threshold force is applied to the handlebars before half locking initiates. This permits free rolling of the vehicle in balanced mode operation as in the main embodiment. When half locking has been initiated, the driver may shirt his weight to unload the spring and by use of arm power apply a force on the handlebars to level the vehicle by the resultant movement of the drive links. The driver may also unload a locked wrapped spring by accelerating or moving and steering the vehicle so as to cause centripetal forces to level the vehicle. The above mentioned methods to unload a locked wrap spring may be used in any combination and simultaneously or sequentially. The wrap spring as utilized in the half locks not only act as clutches, brakes, lock, out also as one way device.

Part of the force actuating the tang remains present even while leveling the vehicle. This force is highest at maximum deflection but decreases to zero when leveled or countered by centripetal motion to the vehicle. The remaining force requires the wrap spring to slip initially under a load in compression. Wrap springs derive their working functionality as a tension device. Slipping under tension is normal for a wrap spring, but can cause wear. In severe loading situation, when a spring binds in compression while backing up, spring damage can occur. Since loads are low, tang force falls off as the machine is leveled, and total rotation of the cylindrical members 198 and 200 never exceeds 30 degrees with respect to each other. The rate of rotation is slow when using the spring as an on demand one way clutch, such that its use is acceptable in this application. On heavier systems it is advisable to apply the wrap spring over a coaxial one way clutch to avoid the potential problems set forth above.

While several embodiments of the invention have been shown, it should be apparent to those skilled in the art that what has been described are considered at the present to be the preferred embodiments of multi-track vehicles with lock and/or drive lean control systems in accordance with this invention. In accordance with the Patent Statutes, changes may be made in the multi-track vehicles with lock and/or drive lean control systems of this invention as set forth above, without actually departing from the true spirit and scope of this invention. The following claims are intended to cover all such changes and modifications which fall in the true spirit and scope of this invention.

What is claimed:

1. A leanable multi-track vehicle having a main chassis for supporting an operator which main chassis is supported on at least three wheels which are spaced from each other, at least a pair of said wheels being located transversely to each other with respect to said main chassis, a subframe for supporting said pair of wheels from said main chassis such that said main chassis may lean with respect to said subframe permitting said pair of wheels to follow the terrain in the roll axis, while not transmitting roll input to the main chassis, a locking means having first and second portions, said first portion of said locking means being secured to said main chassis and said second portion of said locking means being secured to said subframe, for locking said main chassis and said subframe and pair of wheels in a predetermined position with respect to each other, control means for actuating said locking means to first and second half lock conditions, when in said first half lock condition said main chassis is prevented from leaning in a first direction, and when in said second half lock condition said main chassis is prevented from leaning in a second direction opposite said first direction with respect to said subframe, whereby said main chassis may be leaned with respect to said subframe and pair of wheels and locked in said leaned position while said vehicle is in motion or at rest.

2. The leanable multi-track vehicle of claim 1 wherein said control means is manually actuatable by the vehicle operator.

3. The leanable multi-track vehicle of claim 1 wherein said control means is a twist grip manually actuatable by the vehicle operator.

4. The leanable multi-track vehicle of claim 1 wherein said control means is automatically actuatable in response to operating conditions of the vehicle.

5. The leanable multi-track vehicle of claim 4 wherein said vehicle has a steering means, said control means being automatically actuatable in response to a force being applied to said steering means by an operator attempting to prevent increased leaning of the vehicle.

6. The leanable multi-track vehicle of claim 1 wherein said control means includes buffer means such that said control means is automatically actuatable in response to greater than a predetermined minimum force being applied to said steering means by an operator attempting to prevent increased leaning of the vehicle.

7. The leanable multi-track vehicle of claim 6 wherein said buffer means comprises spring means.

8. The leanable multi-track vehicle of claim 1 wherein said control means is automatically actuatable in response to operating conditions of the vehicle, and is manually actuatable by the vehicle operator.

9. A leanable multi-track vehicle having a main chassis supported on at least three wheels which are spaced from each other, at least a pair of said wheels being located transversely to each other with respect to said main chassis, a subframe for supporting said pair of wheels from said main chassis such that said main chassis may lean with respect to said subframe and said pair of wheels, said subframe permitting said pair of wheels to follow the terrain in the roll axis, while not transmitting roll input to the main chassis, a lean input means movable by an operator with respect to the main chassis, a drive means supported by said main chassis and linking said lean input means and said subframe, said drive means supported by said main chassis for causing said main chassis to be leaned with respect to said subframe, said drive means being actuated by the operator to cause said main chassis to be leaned with respect to said subframe and pair of wheels while said vehicle is in motion or at rest, a locking means having first and second portions, said first portion of said locking means being secured to said main chassis and said second portion of said locking means being secured to said subframe, for locking said main chassis and said subframe and pair of wheels in a predetermined position with respect to each other, control means for actuating said locking means between first and second half lock conditions, when in said first half lock condition said main chassis is prevented from leaning in a first direction, and when in said second half lock condition said main chassis is prevented from leaning in a second direction opposite said first direction with respect to said subframe, whereby said main chassis may be leaned with respect to said subframe and pair of wheels and locked in said leaned position while said vehicle is in motion or at rest.

10. The leanable multi-track vehicle of claim 9 wherein said control means is manually actuatable by the vehicle operator.

11. The leanable multi-track vehicle of claim 9 wherein said control means is a twist grip manually actuatable by the vehicle operator.

12. The leanable multi-track vehicle of claim 9 wherein said control means is automatically actuatable in response to operating conditions of the vehicle.

13. The leanable multi-track vehicle of claim 9 wherein said vehicle has a steering means which also functions as the lean input means.

14. A leanable multi-track vehicle having a main chassis for supporting an operator which main chassis is supported on at least three wheels which are spaced from each other, at least a pair of said wheels being located transversely to each other with respect to said main chassis, a subframe for supporting said pair of wheels from said main chassis such that said main chassis may lean with respect to said subframe permitting said pair of wheels to follow the terrain in the roll axis, while not transmitting roll input to the main chassis, a lean input means movable by an operator with respect to the main chassis, a drive means supported by said main chassis and linking said lean input means and said subframe for causing said main chassis to be leaned with respect to said subframe when said input means is moved by the operator, said input means and said drive means being independent of steering of said vehicle, said drive means being operable to cause said main chassis to be leaned with respect to said subframe and pair of wheels while said vehicle is in motion or at rest.

* * * * *